US012751808B2

(12) United States Patent
Sole et al.

(10) Patent No.: US 12,751,808 B2
(45) Date of Patent: Oct. 6, 2026

(54) VETERINARY SAW ASSEMBLY

(71) Applicant: SOLETECH LIMITED, Palmerston North (NZ)

(72) Inventors: David John Sole, Palmerston North (NZ); Georgia Elizabeth Fulton, Mount Maunganui (NZ); Andrew Robert Aitken, Hamilton (NZ); Michael Bryan Williams, Hamilton (NZ); Garth David Riddle, Kaitaia (NZ)

(73) Assignee: SOLETECH HOLDINGS LIMITED, Omokoroa (NZ)

( * ) Notice: Subject to any disclaimer, the term of this patent is extended or adjusted under 35 U.S.C. 154(b) by 278 days.

(21) Appl. No.: 18/567,726

(22) PCT Filed: Jun. 15, 2022

(86) PCT No.: PCT/NZ2022/050076
§ 371 (c)(1),
(2) Date: Dec. 6, 2023

(87) PCT Pub. No.: WO2022/265523
PCT Pub. Date: Dec. 22, 2022

(65) Prior Publication Data

US 2024/0277461 A1 Aug. 22, 2024

(30) Foreign Application Priority Data

Jun. 15, 2021 (NZ) ........................................ 777220
Aug. 24, 2021 (AU) ................................ 2021221540

(51) Int. Cl.
*A61D 1/00* (2006.01)

(52) U.S. Cl.
CPC .................................... *A61D 1/005* (2013.01)

(58) Field of Classification Search
CPC ........ A61D 1/00; A61D 1/005; A61B 17/149; A61B 2017/32006; A01K 17/00
See application file for complete search history.

(56) References Cited

U.S. PATENT DOCUMENTS 7,134,508 B2 11/2006 Prell et al.
9,776,264 B2 10/2017 Shaw
(Continued)

FOREIGN PATENT DOCUMENTS

AU 2010245351 B2 2/2016
CN 105395235 A 3/2016
(Continued)

OTHER PUBLICATIONS

Foreign Communication from a Related Counterpart Application, Examination Report dated Aug. 13, 2024, European Application No. 22825419.9 filed on Dec. 22, 2022.
(Continued)

*Primary Examiner* — Todd J Scherbel

(57) ABSTRACT

A veterinary saw assembly having a tool coupler for coupling to an external power tool and a drive coupler for driving a cutting string from the power tool. The cutting string can be an abrasive wire. The power tool can be a drill. The saw assembly can be used for dehorning or foetotomy procedures. Also disclosed are saws that include the saw assembly, cutting strings for use with the saw assembly, methods of stringing the saw assembly with a cutting string, and a kit including the cutting string and instructions for its use.

18 Claims, 15 Drawing Sheets

(56) References Cited

U.S. PATENT DOCUMENTS

| | | | |
|---|---|---|---|
| 9,883,869 | B2 | 2/2018 | Dijkstra et al. |
| 10,076,797 | B2 | 9/2018 | Pierce et al. |
| 10,271,856 | B2 | 4/2019 | Wolinsky et al. |
| 2005/0216023 | A1 | 9/2005 | Aram et al. |
| 2005/0273110 | A1 | 12/2005 | Boehm, Jr. et al. |
| 2008/0033443 | A1 | 2/2008 | Sikora et al. |
| 2008/0115367 | A1 | 5/2008 | Glynn |
| 2008/0234690 | A1* | 9/2008 | Hawkins .............. A61B 17/149 606/1 |
| 2010/0185209 | A1 | 7/2010 | Schafer |
| 2015/0297257 | A1* | 10/2015 | Galer ............. A61B 17/320092 606/190 |
| 2019/0167277 | A1 | 6/2019 | Moon et al. |

FOREIGN PATENT DOCUMENTS

| | | | |
|---|---|---|---|
| CN | 104227133 | B | 12/2016 |
| CN | 104908085 | B | 3/2017 |
| CN | 107877581 | B | 12/2019 |
| DE | 202004006102 | U1 | 7/2004 |
| DE | 102004018672 | A1 | 11/2005 |
| DE | 202016007746 | U1 | 2/2017 |
| EP | 2764943 | B1 | 9/2019 |
| FR | 1006521 | A | 4/1952 |
| GB | 175875 | A | 3/1922 |
| WO | 2005042213 | A1 | 5/2005 |
| WO | 2014032951 | A2 | 3/2014 |
| WO | 2022265523 | A1 | 12/2022 |

OTHER PUBLICATIONS

Foreign Communication from a Related Counterpart Application, International Search Report and Written Opinion dated Sep. 23, 2022, International Application No. PCT/NZ2022/050076 filed on Jun. 15, 2022.

* cited by examiner

Section I-I

VETERINARY SAW ASSEMBLY

CROSS-REFERENCE TO RELATED APPLICATIONS

The present application is a filing under 35 U.S.C. 371 as the National Stage of International Application No. PCT/NZ2022/050076, filed Jun. 15, 2022, entitled "VETERINARY SAW ASSEMBLY," which claims priority to New Zealand Application No. 777220 filed with the Intellectual Property Office of New Zealand on Jun. 15, 2021, and also claims priority to Australian Application No. 2021221540 filed with the Intellectual Property Office in Australia on Aug. 24, 2021, all of which are incorporated herein by reference in their entirety for all purposes.

FIELD

This invention relates to a veterinary saw assembly. This invention also relates to a method of stringing a veterinary saw assembly. This invention also relates to a kit including cutting string and instructions. This invention also relates to a cutting string.

BACKGROUND

Veterinarians often perform procedures on animals that require them to cut through or cut off body parts. Unlike procedures on humans, these are often performed "in the field" in agricultural settings and without the use of general anaesthetic, highly specialised equipment and surgical assistants.

Veterinary procedures include foetotomy (alternative spelling "fetotomy"), in which an unborn foetus is dissected to assist removal from the birth canal. Foetotomies are typically performed by manually sawing through the foetus in a sequence of specified cuts using an abrasive wire with handles attached. This can be a slow and harrowing procedure for the veterinarian and the animal. It can also require a lot of physical strength and endurance on the part of the veterinarian.

Other veterinary procedures include dehorning, in which horns are cut from animals to prevent them from injuring people or other animals. As with foetotomies, dehorning procedures can be slow, distressing and strenuous. Similar problems exist with traditional methods of performing other veterinary procedures such as tusk or tooth cutting and hoof cutting. Generally speaking, performing these veterinary procedures can require a lot of strength and time because it can involve cutting through large amounts of tough and/or hard animal parts.

Some veterinary tools may be motorised in an attempt to make veterinary procedures faster or easier. However, the integration of motors in such tools may make them expensive to produce and difficult or costly to maintain and repair.

Some veterinary tools, for example motorised tools as discussed above, may be highly specialised and only able to perform a single type of procedure.

SUMMARY

According to one example there is provided a veterinary saw assembly comprising:

- a saw assembly body;
- a drive coupler movably coupled to the saw assembly body and configured to couple to a cutting string and drive longitudinal movement of the cutting string; and
- a tool coupler, wherein the tool coupler is:
- movably coupled to the saw assembly body;
- coupled to the drive coupler; and
- configured to releasably couple to a moving part of the power tool to convert movement of the moving part of the power tool to movement of the drive coupler and thereby to produce longitudinal movement of the cutting string.

Examples of the veterinary saw assembly may be implemented according to any one of the originally filed dependent claims directed to a veterinary saw assembly. According to another example there is provided a method of stringing a veterinary saw assembly, the method comprising:

- providing a cutting string suitable for use with the veterinary saw assembly described above; and
- installing the cutting string on the veterinary saw assembly described above.

Examples of the method may be implemented according to the dependent claim directed to stringing a veterinary saw assembly.

According to another example there is provided a kit comprising:

- cutting string suitable for use with the veterinary saw assembly described above; and
- instructions for installing the cutting string on the veterinary saw assembly described above.

Examples of the kit may be implemented according to the originally filed dependent claim directed to a kit.

According to another example there is provided a cutting string configured for use with the veterinary saw assembly described above, wherein the cutting string comprises a main length with a knob at each end of the main length, each knob being wider than the main length.

Examples of the cutting string may be implemented according to the originally filed dependent claim directed to a cutting string. It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings, which are incorporated in and constitute part of the specification, illustrate examples and, together with the general description of the invention given above and the detailed description of examples given below, serve to explain the principles of the invention.

DETAILED DESCRIPTION

Described herein are examples of a veterinary saw assembly that can perform cutting operations using a cutting string that is ultimately driven by a separate power tool. Providing the veterinary saw assembly with a cutting string and power tool produces a veterinary saw. The power tool is connected to the saw assembly in use to drive the cutting string. By using a power tool to drive the cutting string, veterinary procedures may be performed more quickly, more easily and/or with less distress to the veterinarian and the animal. Reducing the time taken and effort required on the part of the veterinarian may enable less physically strong or capable veterinarians to perform veterinary procedures and/or increase the number of procedures a given veterinarian can perform in a day. It may also improve or preserve the psychological wellbeing of a veterinarian by avoiding long and distressing procedures.

Speeding up procedures can also reduce the distress on animals undergoing the procedures. This may lead to improved health and wellbeing of the animals, which may in turn lead to higher productivity (e.g. more milk or offspring).

By using a power tool coupled to the saw assembly, rather than e.g. a motor integrated in the saw, the saw assembly may be made relatively inexpensive and/or simple to produce, maintain and/or repair.

The veterinary saw described herein may be useful for many veterinary procedures rather than being highly specialised for only one procedure.

Various power tools would be suitable for use with the veterinary saw assembly. For example, the saw assembly could be used with a tool having a rotary output or a linear output. The saw assembly could be used with a tool having a unidirectional output or an oscillatory output.

Figure 1:
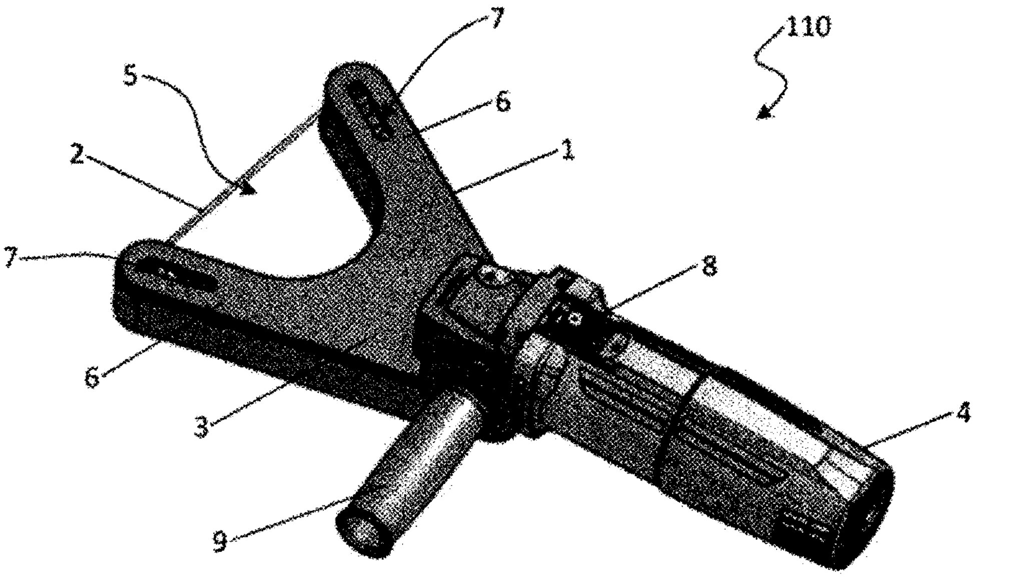
FIG. 1 is an isometric view of a veterinary saw assembly according to one example connected to a power tool.
Figure 2:
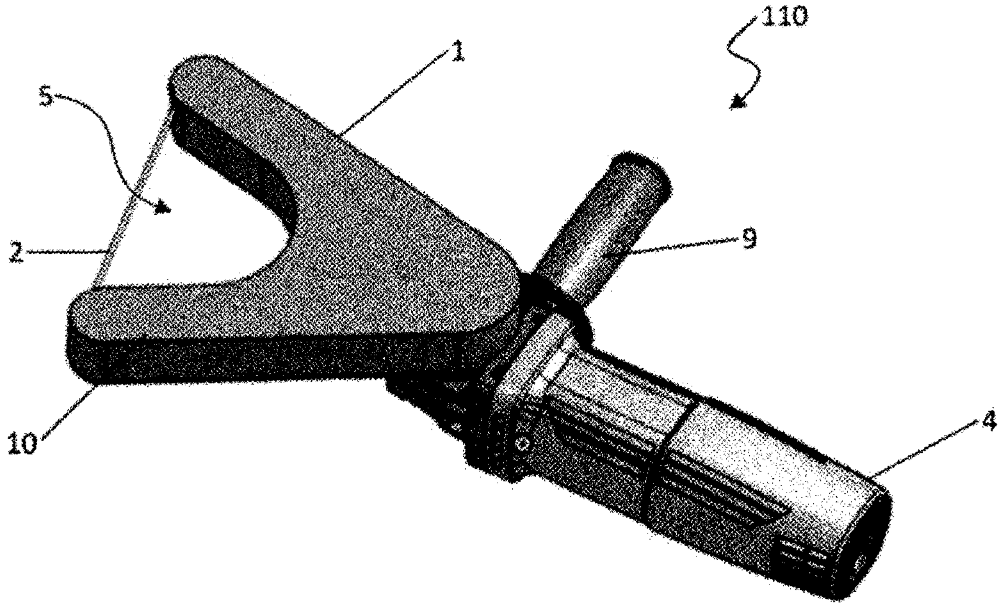
FIG. 2 is another isometric view of the veterinary saw assembly and power tool of FIG. 1.
Figure 3:
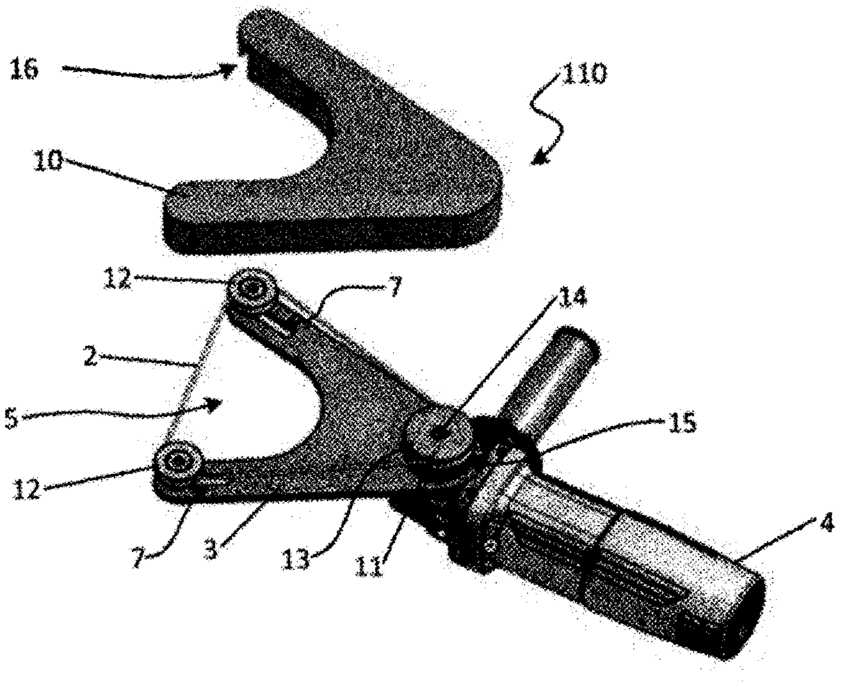
FIG. 3 is another view of the veterinary saw assembly and power tool of FIG. 1 with a cover separated from the rest of the saw.

FIGS. 1 to 3 illustrate a veterinary saw assembly 1 according to a first example. The saw assembly 1 of this example may be particularly suitable for performing a dehorning operation, although it may also be suitable for other procedures such as cutting tusks, teeth, antlers, deer velvet, or hooves. The veterinary saw assembly 1 is shown connected to a power tool 4. In this example, the power tool 4 is an angle grinder. The veterinary saw assembly 1 is shown with a cutting string 2 installed. The assembly 1 with cutting string 2, in combination with the power tool 4, forms a veterinary saw 110.

Figure 4:
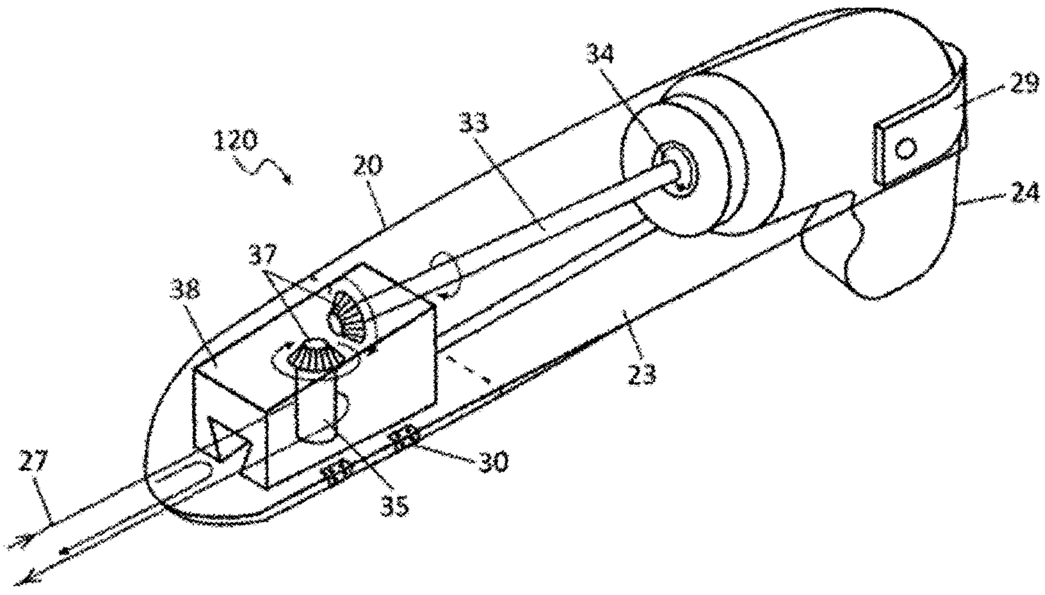
FIG. 4 is an isometric view of veterinary saw assembly according to another example connected to a power tool.
Figure 5:
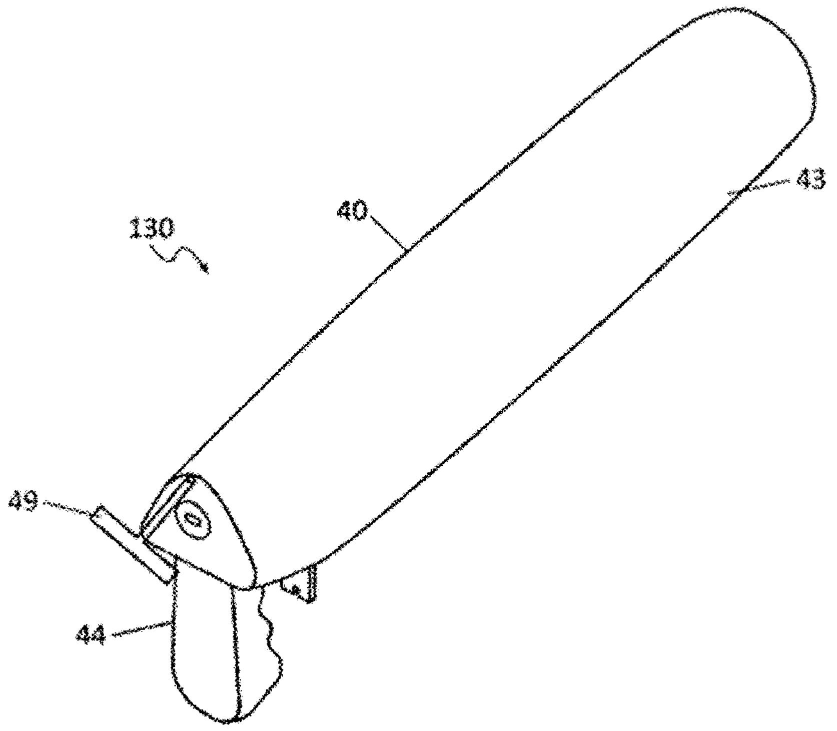
FIG. 5 is an isometric view of a veterinary saw assembly according to another example connected to a power tool.

The cutting string 2 is ultimately driven by the power tool 4. As best shown in FIG. 3, the saw assembly includes a tool coupler 13 for releasably coupling to a moving part of the power tool 4. In the example of FIGS. 1 to 3, the moving part of the power tool is a rotating spindle 14 of the power tool 4. In other examples the moving part of the power tool could be, for example, a saw blade or blade holder of a reciprocating saw, a chuck of a power drill (e.g. as shown in FIGS. 4 and 5), or a bit extending from a chuck of a power drill.

The releasable nature of the coupling to between the tool coupler 13 and the power tool 4 means that the saw assembly 1 may be provided as a separate item from the power tool 4. A user can attach the saw assembly 1 to a standard or common power tool to produce a powered veterinary saw. The user can then detach the saw assembly 1 from the power tool to allow the power tool to be used for other purposes. This may also allow the user to replace the saw assembly 1 with another attachment. For example, the user may replace one veterinary saw assembly (such as the saw assembly shown in FIGS. 1-3) with a different veterinary saw assembly (such as the saw assembly shown in FIG. 10).

In the example shown in FIGS. 1-3 the tool coupler couples to the spindle 14 of the power tool in a way similar to the way a grinder disc would attach to the spindle 14. For example, the spindle 14 may have a narrow, threaded distal end that extends into or through an aperture in the inner portion of the body of the tool coupler and a wider portion or flange that abuts the underside of the body of the tool coupler 11 about the aperture. The inside of the aperture may be threaded to screw onto the threaded end of the spindle 14. Alternatively, the threaded end may extend through the aperture and a nut or threaded flange plate may screw onto the threaded end of the spindle 14, clamping the tool coupler between itself and the wider portion of the spindle 14. In another example, the aperture may be shaped (e.g. generally X shaped) to engage with an automatic locking spindle such as a Bosch X Lock spindle.

To drive movement of the cutting string 2, the saw assembly 1 includes a drive coupler 15 (shown FIG. 3). The drive coupler 15 is connected to the tool coupler 13 so that movement of the tool coupler 13 drives movement of the drive coupler 15 and ultimately drives longitudinal movement of the cutting string 2. By longitudinal movement of the cutting string 2 it is meant that the cutting string 2 is driven to move such that locally a length of the cutting string generally moves in the direction of its long axis. The drive coupler can be frictionally coupled to the string so that movement of the drive coupler is transferred to the cutting string via friction. This may allow some slip of the string over the drive coupler, for example if the cutting string 2 gets caught in the cut material. In one example, the drive coupler 15 can support the cutting string about its peripheral portion. The peripheral portion can include a channel formed in it for receiving the cutting string. This may help to centre the cutting string and prevent it from coming off the drive coupler in use.

In the example shown in FIGS. 1-3, the tool coupler 13 and the drive coupler 15 are directly connected to each other. In other examples, the tool coupler 13 and the drive coupler could be indirectly connected, for example via one or more of a clutch, gears (including speed reduction or multiplication gearings), a drive belt, a drive chain, a mechanism for converting between linear and rotary motion, and/or a mechanism for converting between uni-directional and oscillatory motion. As best shown in FIG. 3, the tool coupler 13 and the drive coupler 15 can both be provided on a single disc 11. In particular, the inner portion of the disc 11 is configured to be mounted to the tool 4 and acts as the tool coupler 13 and the peripheral portion of the disc 11 is configured to support the cutting string 2 and provides the drive coupler 15.

The saw assembly 1 includes a saw assembly body 3 that engages with the body (e.g. a non-moving part) of the tool 4. The body 3 stabilises the saw assembly 1 on the tool 4. The body 3 can also support components of the saw assembly. The saw assembly 1 can also include a cover 10. The cover 10 and saw assembly body 3 can together form a housing of the saw assembly. The cover 10 can be opened to allow access to internal components of the saw assembly 1. The cover 10 can be removed as shown in FIG. 3 to allow a user to access the driver coupler 15 to install or remove the cutting string 2. Alternatively, the cover could be opened on a hinge or can slide open without being removed. The cover 10 can also include openings 16 for the cutting string 2 to pass through, allowing it to extend from the interior of the housing to the exterior of the housing. The saw assembly body 3 can have a recess formed at one side. In the example of FIGS. 1-3 the recess 5 is formed at the front side of the saw assembly 1—i.e. the side facing away from the user in use. The recess 5 is provided between two legs 6 of the saw assembly body 3. The string 2 can extend across the recess 5 between the legs 6. An item to be cut, for example a horn, tusk, tooth or hoof, can be placed between the string 2 and the body 3 in the recess 5 to perform a cutting operation. Alternatively, the item to be cut can be placed in front of the cutting string 2 (i.e. on the opposite side of the cutting string 2 from the recess 5) and the saw pushed towards the item to be cut during a sawing operation. The recess 5 would provide space for the cutting string 2 to be pushed into during the cutting operation.

The saw assembly 1 can include a cutting string guide 12 at each side of the recess 5 to maintain the string 2 in position across the recess 5. In this example, the cutting string guides are idler pulleys. The cutting string guides 12 can move to adjust the length of a cutting portion of the cutting string 2. The cutting portion of cutting string 2 is a portion that is located at the exterior of the saw assembly where it can contact an item to be cut. The string guides 12 are mounted in slots 7 in the saw assembly body 3. By moving the string guides 12 back and forth along the slots 7, the amount of slack in the cutting string can be increased and decreased, thereby increasing and decreasing the amount that can extend outside of the saw assembly 1. Fixtures can be provided for fixing the string guides in place along the slots to set a desired amount of slack/length of cutting portion. For example, a hand-operated knob or wingnut can be provided on the underside of each cutting string guide 12 to tighten onto the body 3 and fix the string guide 12 in place. Alternatively, springs may be used to bias the string guides towards the position of minimum slack/minimum length of cutting portion. A user could then compress the springs and increase slack on the cutting string by pulling the cutting string guides back against the spring bias or by pulling the cutting string directly. Moving the string guides can also help to install or remove the cutting string. In particular, the slack could be increased to make it easier to remove an installed string. The string guides can be placed or left in the high-slack position when installing a string, and the string guides can then be moved to tighten the string once it is installed.

An exemplary use of the veterinary saw 110 could be as follows. A user could first move the string guides 12 to increase the slack on the cutting string 2. The user could then place a horn of a cow within the recess 5. The user could then tighten the cutting string 2 by moving the string guides 12. Holding the power tool 4 by the main body of the tool 4 and the handle 9, the user can pull the tool 4, which pulls the cutting string against the horn. They can then start the tool using the switch 8. This would cause the spindle 14 of the tool 4 to spin and the cutting string 2 to circulate over the drive coupler 15 and string guides 12. The cutting string will then cut through the horn. Alternatively, a similar procedure could be performed but with the string 2 being pushed through the horn.

FIG. 4 shows an alternative example of a veterinary saw assembly 20. The saw assembly 20 of this example may be particularly useful for performing foetotomies. The saw assembly 20 with the cutting string 22 in combination with the power tool 24 forms a veterinary saw 120.

In this example, the saw assembly body 23 and cover 30 form an elongate housing. In this case, the cover 30 is hinged to the body 23. The elongate housing is sized and shaped to be able to be inserted into the birth canal of an animal. In particular, the width of the housing is designed to fit within the birth canal without causing excessive discomfort to the animal and the length of the housing is designed so that the distal end of the saw 120 can be brought into close proximity to the foetus while a user is holding the power tool 24 outside of the animal.

In this example, the power tool 24 is a power drill. In other examples, the power tool can be a reciprocating or oscillating tool, for example a reciprocating saw, oscillating saw or oscillating multi-tool. In each of those examples, the tool coupler would be configured to couple to a moving part of the respective tool. The moving part could be the blade holder or attachment holder of the tool. For example, when the power tool is a reciprocating saw, the tool coupler could be sized and shaped to approximate the base of a reciprocating saw blade so that it can be coupled to by the blade holder of the reciprocating saw. Similarly, the tool coupler can be sized and shaped to approximate blades or attachments appropriate for the other types of tool so that it can be coupled to by their blade or attachment holders.

The tool coupler 33 of the saw assembly 20 in this case is a shank that can engage with the chuck 34 of the power drill. Alternatively, the tool coupler could be a shank or socket configured to couple to a drill bit, where the shank could couple to a drill bit with a recess such as a non-circular socket and the socket could fit over the outer surface of a non-circular drill bit such as a hex driver. The tool coupler 33 is connected to the drive coupler 35 via a pair of bevel gears 37 that covert rotation in one axis to rotation in another axis. For example, the tool coupler 33 can extend along the long axis of the saw assembly 20, which would allow the user to hold the drill at a comfortable angle. The bevel gears 37 can covert the rotation of the tool coupler 33 about the long axis through 90° so that the drive coupler 35 can drive a loop of cutting string 22 that is looped around it and that extends forwards from the distal end of the saw assembly 20. The bevel gears 37 can be mounted in a gear block 38. In alternative examples, a different mechanism than a pair of bevel gears may be used to convert rotation of the tool coupler to linear movement of the cutting string generally in the same direction as the axis of rotation of the tool coupler (e.g. along the long axis of the saw assembly). For example, a pair of intermediate idler pulleys may be provided that each contact one limb of the cutting string between the distal end of the saw assembly and the drive coupler. The pulleys can be arranged at a suitable angle to turn the cutting string through approximately 90° where it passes over them.

A strap 29 can be provided on the saw assembly body 23 for securing the power tool 24 and the saw assembly 20 together.

The saw assembly 40 of FIG. 5 is similar to the one of FIG. 4. The saw assembly 40 is attached to a power tool 44, in this case a power drill, to provide a veterinary saw 130. The saw assembly body 43 provides an elongate housing suitable for insertion into a birth canal of an animal. The saw assembly 40 may be particularly suitable for performing foetotomies.

The saw assembly 40 of FIG. 5 has a handle 49. As will be described in more detail with reference to FIG. 6, the handle 49 can be used to adjust the amount of cutting string that extends from the saw assembly 40.

Figure 6:
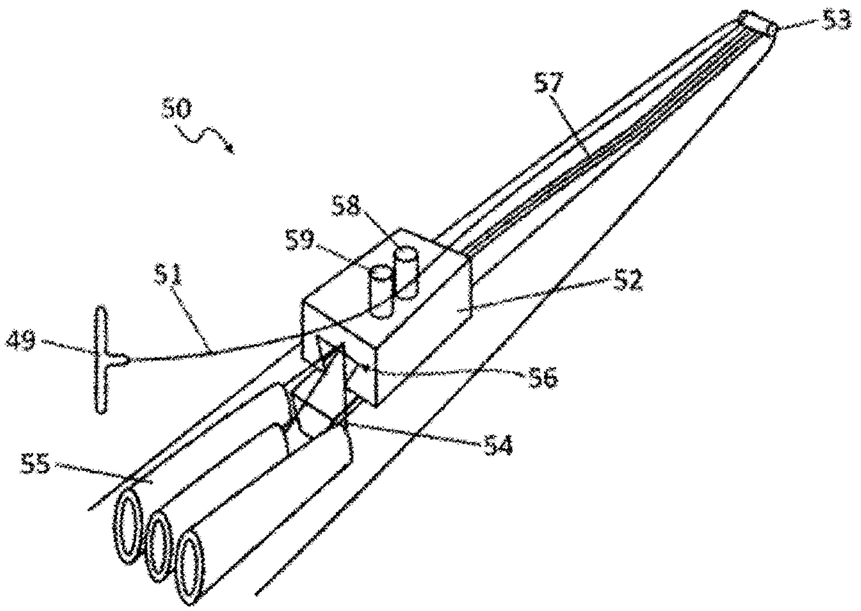
FIG. 6 is an isometric view of components of a veterinary saw assembly according to an example.

FIG. 6 shows a sub-assembly 50 for adjusting the length of a cutting portion of a cutting string. The handle 49 is attached to a cord 51 that passes around a cord guide (e.g. a pulley) at the distal end of the saw assembly. The cord 51 then doubles back to the block 52, which it is attached to. Also attached to the block 52 are one or more biasing members for biasing the block towards the proximal end of the saw assembly. The biasing members can include one or more springs and/or one or more elastic cords, for example. In this example, the biasing members includes three elastic cords 54 extending from respective housings 55.

When the cord 51 is pulled, the biasing member(s) (e.g. cords 54) are tensioned. In response, the biasing member(s) pull the block back towards the proximal end and attempt to retract the cutting string. When the cutting string is placed over an item to be cut, such as a part of a foetus, the cutting string will be pulled tight around the item by the biasing member(s). As the cutting string cuts through the item, the cutting string is further retracted into the saw assembly while tension is maintained on the cutting string by the biasing member(s). In an alternative arrangement, the cutting string can be retracted and tension maintained on it by the user pulling back on a part connected to the cutting string. For example, the user can pull back on the power tool which can transfer this pulling force to the cutting string. In this arrangement, the tool coupler would be coupled to the drive coupler to transmit pulling force to it, for example by being mounted in the same block (similar to sliding block 52) or being part of the same member (for example like the disc 11 of FIG. 3).

The block 52 includes a recess 56 with a concave cross section shaped to match the convex cross section of a rail 57 than runs along the length of the saw assembly. This allows the block 52 to slide along the saw assembly. In this example, the recess 56 and rail 57 are configured as a sliding dovetail joint.

Figure 7:
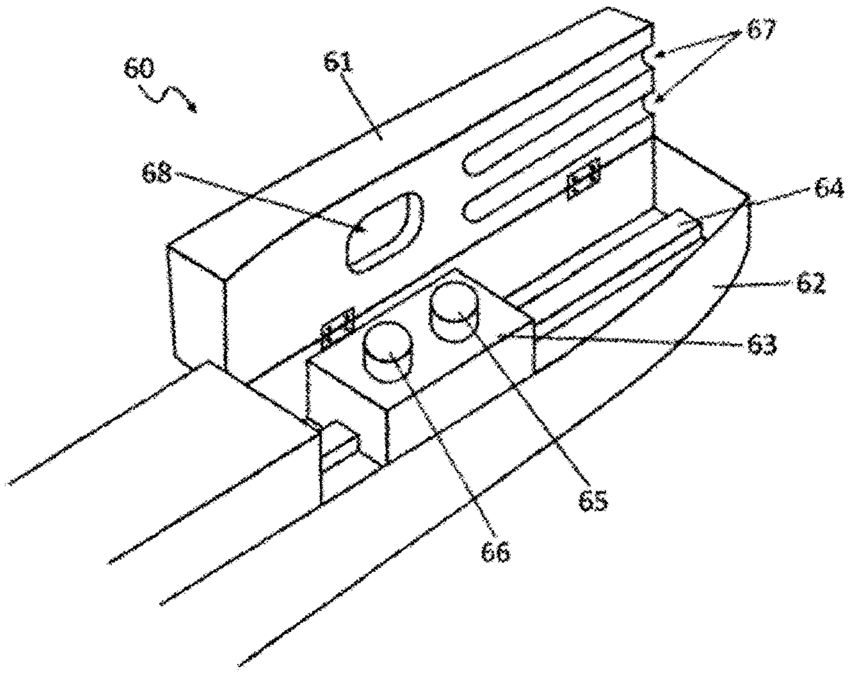
FIG. 7 is an isometric view of components of a veterinary saw assembly according to another example.
Figure 8:
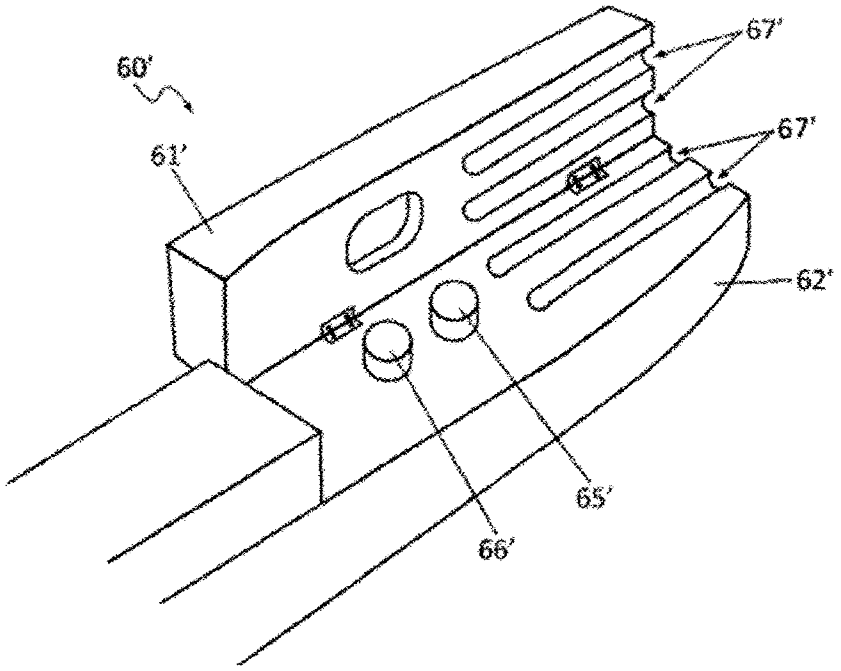
FIG. 8 is an isometric view of components of a veterinary saw assembly according to another example.
Figure 9:
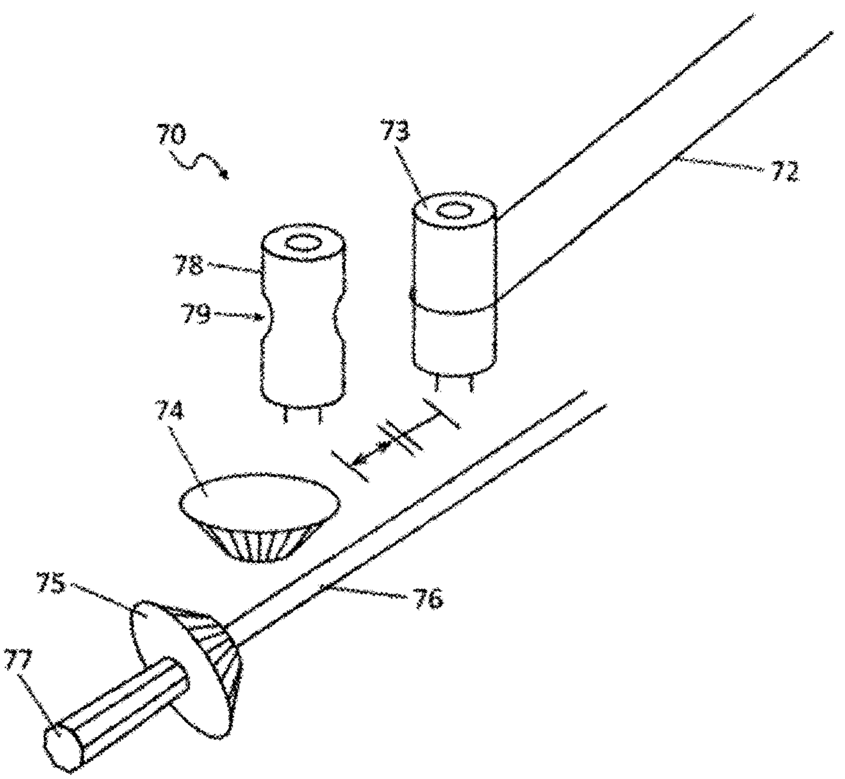
FIG. 9 is an isometric view of components of a veterinary saw assembly according to another example.

The block 52 has the drive coupler 58 mounted to it. In this example, the drive coupler 58 is a drive pulley. In use, the cutting string would be coupled to the drive coupler 58 so that when the block 52 moved along the rail 57 the amount of the cutting string that extended from the saw assembly would be varied. Also mounted to the block is a retainer 59, which can help retain the cutting string on the drive coupler 58. In this example, the retainer 59 is an idler pulley located adjacent or close to the drive coupler 58 (which in this example is also a pulley). Similar retainers 66 and 66' are shown in FIGS. 7 and 8 and a detailed example retainer 78 is shown in FIG. 9. In other examples, the retainer could be a grooved block or similar that need not rotate.

Figure 10:
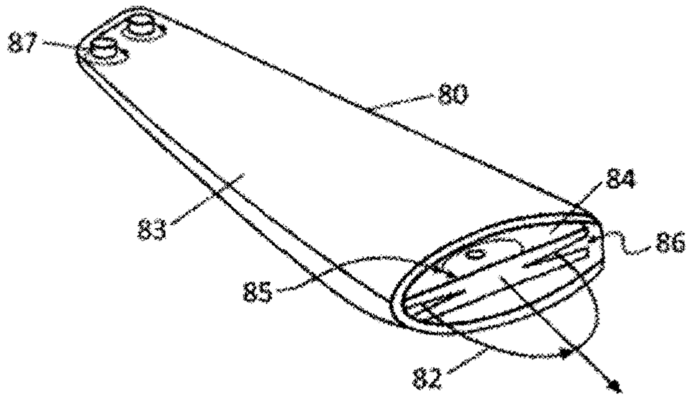
FIG. 10 is an isometric view of a veterinary saw assembly according to another example.

The sub-assembly 50 could be used in other saw assemblies, for example the saw assembly 20 of FIG. 4 or the saw assembly 80 of FIG. 10.

In addition to allowing the amount of string that extends from the saw assembly to be adjusted, the sub-assembly 50 may also facilitate coupling of the tool to the tool coupler 77. For example, when coupling the tool coupler 77 to the chuck of a power drill, a user may need to hold the chuck manually (in a keyless chuck) or insert and turn chuck key to tighten the chuck on the tool coupler 77. In saw assembly designs like that of FIG. 4, the drill may be partly inserted into the housing of the saw assembly and difficult to reach with a hand or chuck key. With the sub-assembly 50, the tool coupler 77 can slide backwards to extend from the saw assembly, with the drive shaft 76 sliding backwards through the first bevel gear 75. The user can pull the tool coupler back so that it can be inserted into the chuck of a power drill before inserting the power drill into the housing. The user can then easily access the chuck to tighten it on the tool coupler 77. Once the tool coupler is secured in the chuck, the drill can be inserted into the housing, with the drive shaft sliding forwards through the first bevel gear 75.

FIG. 7 shows the distal end 60 of a saw assembly according to one example. This could be a saw assembly that is particularly suitable for performing foetotomies such as the saw assemblies 20 and 40 of FIGS. 4 and 5. A hinged cover 61 is attached to the saw assembly body 62. Two channels 67 are formed in the cover 61 for allowing the cutting string to pass out of the saw assembly. The drive coupler 65 is mounted on a block 63. As in the sub-assembly 50 of FIG. 6, the block 63 can slide along a rail 64. Also provided on the block is a retainer 66 for helping to retain the cutting string on the drive coupler 65.

The cover 61 also has a recess 68 formed in its underside for receiving the upper ends of the drive coupler 65 and retainer 66. When the drive coupler 65 and retainer 66 extend into the recess, the cover bridges the gap between their upper ends. This also helps to prevent the cutting string from coming off the drive coupler.

FIG. 8 shows the distal end 61' of an alternative saw assembly to that of FIG. 7. In this example, the drive coupler 65' and the retainer 66' are fixed in place in the saw assembly body 62'. The cover 61' and the saw assembly body 62' body each have two channels 67'.

FIG. 9 shows an exemplary drive sub-assembly 70 that may be particularly suitable for use with a saw assembly that is configured to be driven by a power drill, like the ones of FIGS. 4 and 5. The drive sub-assembly 70 can engage with a rotating part of a power tool, covert the rotation from one axis to another and drive a cutting string 72 while allowing for longitudinal movement of the drive coupler 73 to adjust the amount of the cutting string 72 that extends from the saw assembly.

The drive sub-assembly 70 includes a tool coupler 77 in the form of a shank for coupling to a chuck of a drill. The shank is connected to a drive shaft 76. The drive shaft 76 engages with a complementary hole in the first bevel gear 75 to rotationally couple the first bevel gear 75 to the tool coupler 77 while allowing relative movement between the drive shaft 76 and the first bevel gear 75 along the length of the drive shaft 76—i.e. the first bevel gear 75 can slide along the drive shaft 76. The drive shaft 76 can have a non-circular cross section, e.g. a hexagonal cross section, to engage with a hole of the same cross-sectional shape in the first bevel gear 75. The first bevel gear 75 is engaged with a second bevel gear 74. The second bevel gear 75 is connected to the drive coupler 73 to drive rotation of the drive coupler 73 and thereby drive movement of the cutting string 72. The second bevel gear 74 can be directly and co-axially connected to the drive coupler. In the example shown in FIG. 9, the drive coupler 73 is in the form of a pulley and the second bevel gear 74 could be connected directly to the shaft of the pulley.

The sub-assembly 70 also includes a retainer 78. The retainer 78 in this example is a pulley with a waist 79. The waist allows the pulleys to sit very close to or in contact and flush with each other to help retain the cutting string. When the pulleys are together, the waist provides a passage for the cutting string to extend through. One or both of the drive coupler 73 and the retainer 78 can be slidably mounted. This allows the space between the drive coupler 73 and the retainer to be adjusted, as indicated by the arrows. The spacing can be increased to install or remove the cutting string and then decreased by bringing the drive coupler 73 and retainer 79 together to retain the cutting string between them in use.

Although in this example only the retainer is waisted, the drive coupler 73 could also have a waist.

The first bevel gear 75, second bevel gear 74 and drive coupler can be mounted in a block, for example one of the blocks 38, 52 and 63 of FIGS. 4, 6 and 7. The block can be movable by a movement sub-assembly, for example the sub-assembly 50 of FIG. 6. FIG. 10 shows a veterinary saw assembly 80 that may be particularly suitable for performing foetotomies. The saw assembly 80 includes a saw assembly body 83 in the form of an elongate housing suitable for insertion into a birth canal. A difference between the saw assembly 80 of FIG. 10 and the saw assemblies 20 and 40 of FIGS. 4 and 5 is that the saw assembly 80 is configured to be driven by a vertically oriented rotating spindle, for example of an angle grinder. The saw assembly 80 is coupled to the rotating spindle by a tool coupler 85, which can be an inner portion of a coupler body mounted on the spindle. The cutting string 82 is coupled to a drive coupler 86 of the saw assembly 80, which can be a peripheral portion of a drive coupler body and may have a channel formed in it for receiving the cutting string 82. The drive coupler body and tool coupler body can be provided by a disc 84. In FIG. 10, a cross section has been taken through the disc to show internal features of the saw assembly 80.

In this example, the amount of cutting string that extends from the body of the saw assembly for cutting material can be adjusted by sliding the tool coupler 85 and drive coupler 86 back and forth along the body of the tool. For example, in the case where the tool coupler 85 and drive coupler 86 are both provided on a disc 84, the disc 84 may be slid back and forth. The saw assembly body 83 can have an elongate slot (not shown) to allow the spindle of the power tool to pass through the body and slide longitudinally.

In the case where a saw assembly is designed for performing foetotomies, additional couplers may be provided on the saw assembly for attachment of puller chains. These can be used to pull sections of a cut foetus from the animal and may be known as leg chains. For example, any of the saw assemblies 20, 40 and 80 of FIGS. 4, 6 and 7 could have couplers such as rear-facing hooks, loops or lugs on the respective saw assembly body 23, 43 or 83.

The saw assemblies discussed herein can also have one or more wipers for removing debris caused by the cutting process from the cutting string. The wipers could include bristles or rubber blades, for example.

The saw assemblies discussed herein can include a linkage for converting uni-directional rotary motion to oscillatory motion. Power tools such as power drills and angle grinders typically only rotate in one direction for a given setting and either can not rotate in the reverse direction or require user to operate a switch to change the direction of rotation. The linkage allows the unidirectional rotation of the power tool to be converted to oscillatory motion. Oscillatory motion drives the cutting string back and forth. This means that only a portion of the cutting string performs cutting. This may be particularly useful in messy procedures such as foetotomies because it means that debris from the procedure will not be drawn into the housing of the saw assembly because the cutting string does not fully circulate. The linkage could output oscillatory linear motion—i.e. reciprocating motion—to a drive coupler. In this case, the drive coupler could include attachment points to which the ends of the cutting string are attached and driven back and forth. In another example, the linkage outputs oscillatory rotary motion to the drive coupler. In this case, the drive coupler could include a pulley or disc, for example, to drive a loop of cutting string.

Figure 17:
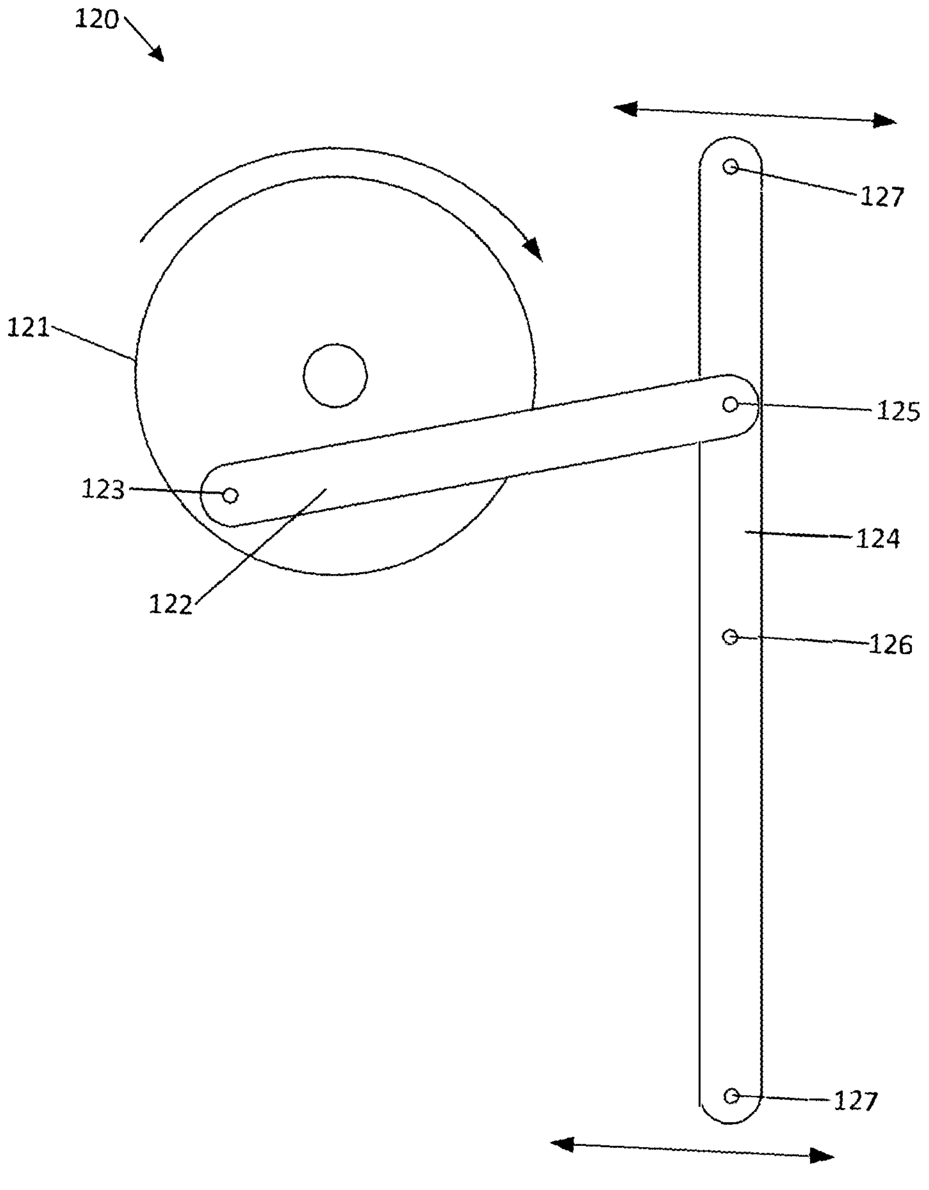
FIG. 17 is a linkage for converting rotary to oscillatory motion according to one example.

One exemplary linkage 120 for converting uni-directional rotary motion to oscillatory motion is shown in FIG. 17. The linkage includes a disc 121 and link arms 122 and 124. The disc 121 rotates as indicated by the arrow. One end of the link arm 122 is coupled to the disc 121 at point 123. As the disc rotates, the arm 122 alternately pulls and pushes on the link arm 124, which it is attached to at point 125. The link arm 124 is pivotally mounted at point 126. When the link arm 122 pulls and pushes on the link arm 124 (at a point 125 that is offset from the pivot point 126 of the link arm 124) it causes the ends of the link arm 124 to oscillate as indicated by the arrows (left and right in the orientation shown in FIG. 17). The opposite ends of the link arm oscillate 180° out of phase with each other. A cutting string can be attached to the link arm 124 at points 127 so that it can be driven to oscillate back and forth.

Figure 11:
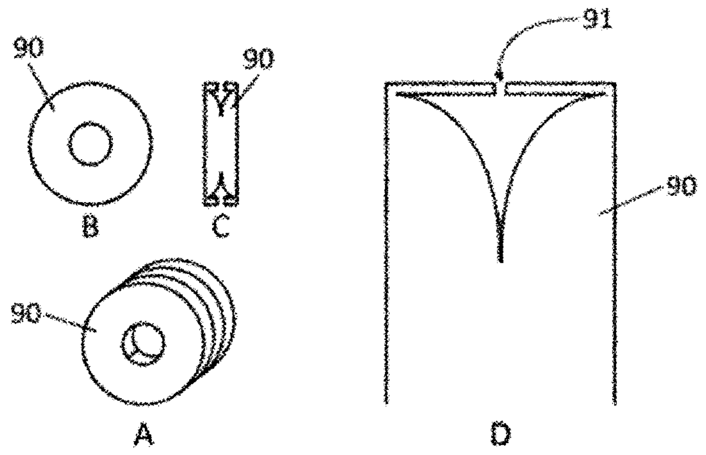
FIGS. 11A-11D are a set of views of a disc for use in a veterinary saw assembly according to one example.

An exemplary use of one of the saw assemblies 20, 40 and 80 could be as follows. A user can attach the saw assembly to a power tool such as a power drill or an angle grinder and install a cutting string. The user can then insert the elongate housing of the saw assembly into the birth canal of the animal, increase the length or slack of the portion of the cutting string that extends from the saw assembly and loop it around a part of the foetus to be cut. They may also attach puller chains to the foetus. The user can then tighten the cutting string (or allow it to be tightened by biasing members) around the foetus. The user can then activate the power tool to drive the cutting string to cut through the foetus. Once the foetus is cut through, the user may pull out a cut portion of the foetus using the puller chains. The user may then reposition the cutting string over the foetus to make another cut, reattach the puller chains on another part of the foetus, and repeat the cutting and removal process until all of the foetus has been removed from the animal. FIG. 11 shows an exemplary disc 90 for use with a saw assembly. For example, the disc 90 could be used as one of the discs 11 or 84 of FIGS. 3 and 10. In particular, FIG. 11 provides detailed views of an exemplary drive coupler 91 that includes a channel formed in the periphery of the disc 90. FIG. 11A is an isometric view of the disc 90, FIG. 11B is a top view of the disc 90, FIG. 11C is a cross section through the disc 90, and FIG. 11D is a detailed view of the drive coupler 91 of the cross section of Figure C.

Figure 12:
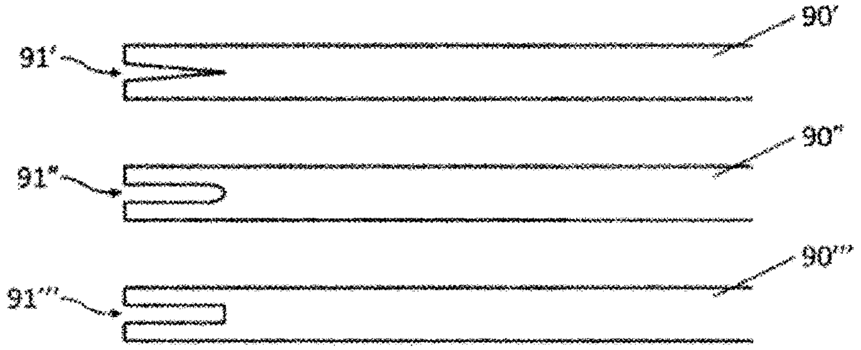
FIG. 12 shows three discs for use in a veterinary saw assembly according to other examples.

FIG. 12 shows details of alternative discs 90', 90'' and 90'''. These discs differ from disc 90 of FIG. 11 in that the drive couplers 91', 91'' and 91''' have channels of different shapes. Which channel shape is best in a given application may depend on one or more of the type and dimensions of the cutting string, the material of the disc, the configuration of the saw assembly, and the intended speed of operation.

Figure 13:
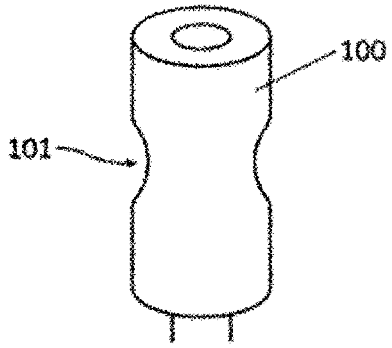
FIG. 13 is an isometric view of a pulley for use in a veterinary saw assembly according to one example.

FIG. 13 shows an exemplary pulley 100 for use with a saw assembly. For example, the pulley 100 could be used as one of the pulleys 35, 58, 65, 65' or 73 of FIGS. 4, 6, 7, 8 and 9. The pulley 100 has a waist 101 that provides a channel for receiving the cutting string. This may help to centre and retain the cutting string on the pulley 100.

Figure 14:
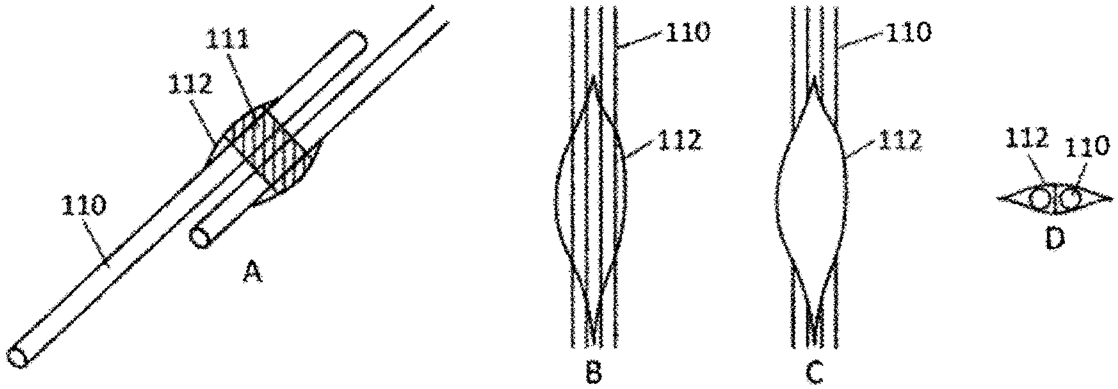
FIGS. 14A-14D are a set of views of an arrangement for joining ends of a cutting string according to one example.
Figure 15:
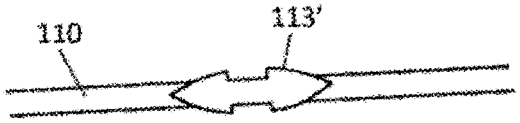
FIG. 15 is an arrangement for joining ends of a cutting string according to another example.
Figure 16:
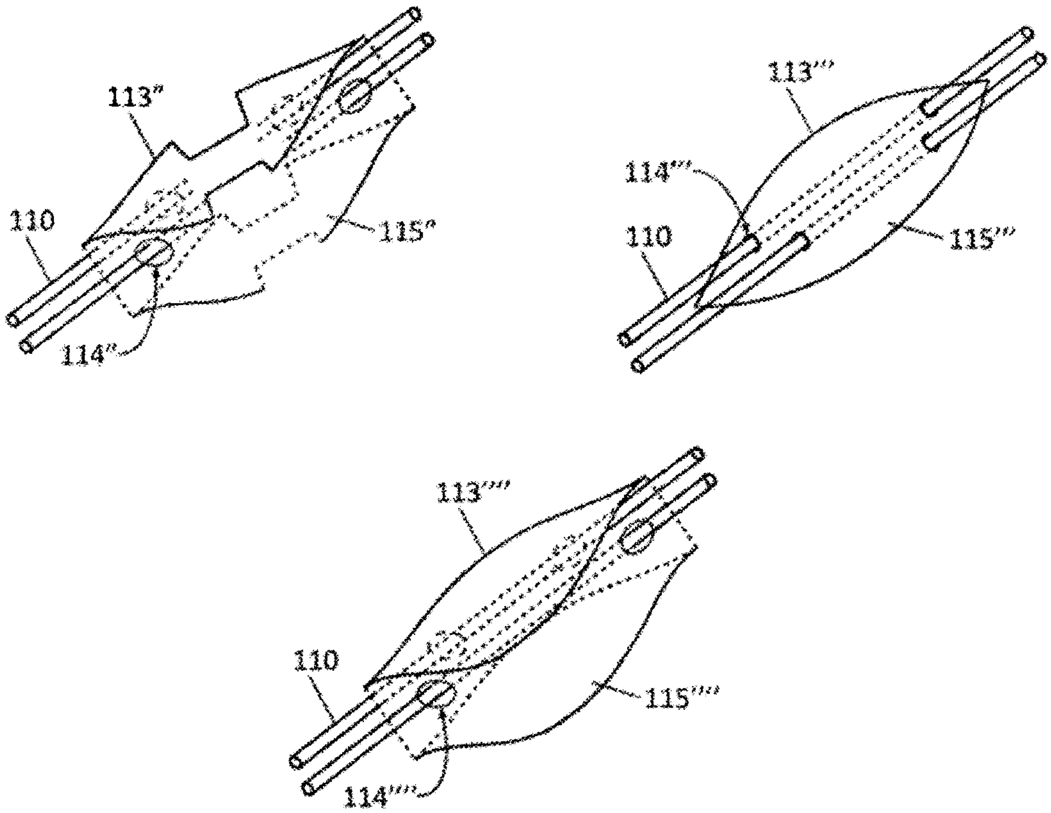
FIG. 16 shows three more arrangements for joining ends of a cutting string according to other examples.

In some examples, the cutting string may be a loop. A loop would be particularly suitable when the cutting string circulates in a single direction rather than oscillates, but a loop could also be used when the cutting string oscillates. The loop of cutting string may be formed by joining the ends of a length of cutting string material (for example, abrasive wire) to each other. FIGS. 14 to 16 show various arrangements for joining the ends of the cutting string material to form a loop.

In FIG. 14, a band 111 is placed tightly around the ends of the cutting string 110 to cinch them together. This is best shown in FIG. 14A. The band 111 could be, for example, a steel cable tie or a crimp. A sheath 112 is placed over the band 111 to smooth the surface of the cutting string in the region of the join. FIG. 14B best shows the outline of the sheath and its placement over the joined ends of the cutting string 110. FIGS. 14C and 14D best show the smooth surface of the sheath 112. The sheath 112 could be, for example, a thin piece of metal folded over the join, or it could be a blob of solder or metal deposited by a welder. The ends of the wire may be joined side-by-side or in a butt joint.

FIGS. 15 and 16 show two ends of cutting string 110 joined by a various alternative forms of connector 113', 113'', 113''' and 113''''. The connectors can achieve the mechanical connection of the ends of the cutting strings while also having a smooth outer surfaces, thereby performing the functions of both the band 111 and sheath 112 of FIG. 14.

In FIG. 15 the ends of the cutting string 110 are joined end-to-end in a butt joint. in FIG. 16, the ends of the cutting string 110 are joined side-by-side. The connectors 113', 113'', 113''' and 113'''' can have holes 114'', 114''' and 114'''' for receiving the ends of the cutting string 110 and wings 115'', 115''' and 115'''' that can be folded over to provide a smooth surface over the join.

In some examples, the cutting string discussed herein is made of metal (e.g. steel) wire. Wire can be particularly suitable to heavy-duty cutting operations due to its strength and hardness. In other examples, different materials could be used. For example, in soft tissue-cutting procedures a material such as nylon or Kevlar may be a suitable material for the cutting string.

In some examples, the cutting string is an abrasive string that cuts by abrading the item. In other examples, the cutting string may have teeth or other protrusions or embedded objects to perform cutting, instead of or in addition to being abrasive.

In particular, the cutting string can be made of an abrasive wire commonly used for performing foetotomies and known as foetotomy wire.

Providing a suitable cutting string will involve providing a cutting string that is of a suitable length for use with the saw assembly. If a length of cutting string is too short, it may not be able to couple to the drive coupler and still extend to the exterior of the tool. A piece of cutting string that is longer than needed for the saw assembly could still be suitable as it may be cut down to an appropriate length. In some cases the cutting string may be provided with its ends joined to form a loop, although in other cases the cutting string may be an open (non-looped) piece. The open piece could have its ends joined into a loop by a user (for example using the arrangements of FIGS. 14-16) or it may be used without forming into a loop, for example by connecting each end of the cutting string to the drive coupler separately. A length of cutting string long enough for being cut into several cutting strings could be provided in a roll, a skein or the like.

The cutting string can be installed on the saw assembly by arranging it in or on the saw assembly body such that a portion of the string can extend to the exterior of the saw assembly to act as the cutting portion. It can also include coupling the cutting string to the drive coupler. In an example where a loop of cutting string is retained on the periphery of a disc or pulley, this can involve placing the cutting string around the disc or pulley. In an example where the cutting string is not a loop, this may involve attaching each end of the cutting string to a connection point on the drive coupler. This could involve, for example, passing the end of the cutting string through a hole in the drive coupler and tying or crimping the end of the string off to connect it to the hole. Alternatively, a wider portion like a knob or similar on each end of the cutting string could be retained in a complementary recess in the drive coupler.

Figure 26:
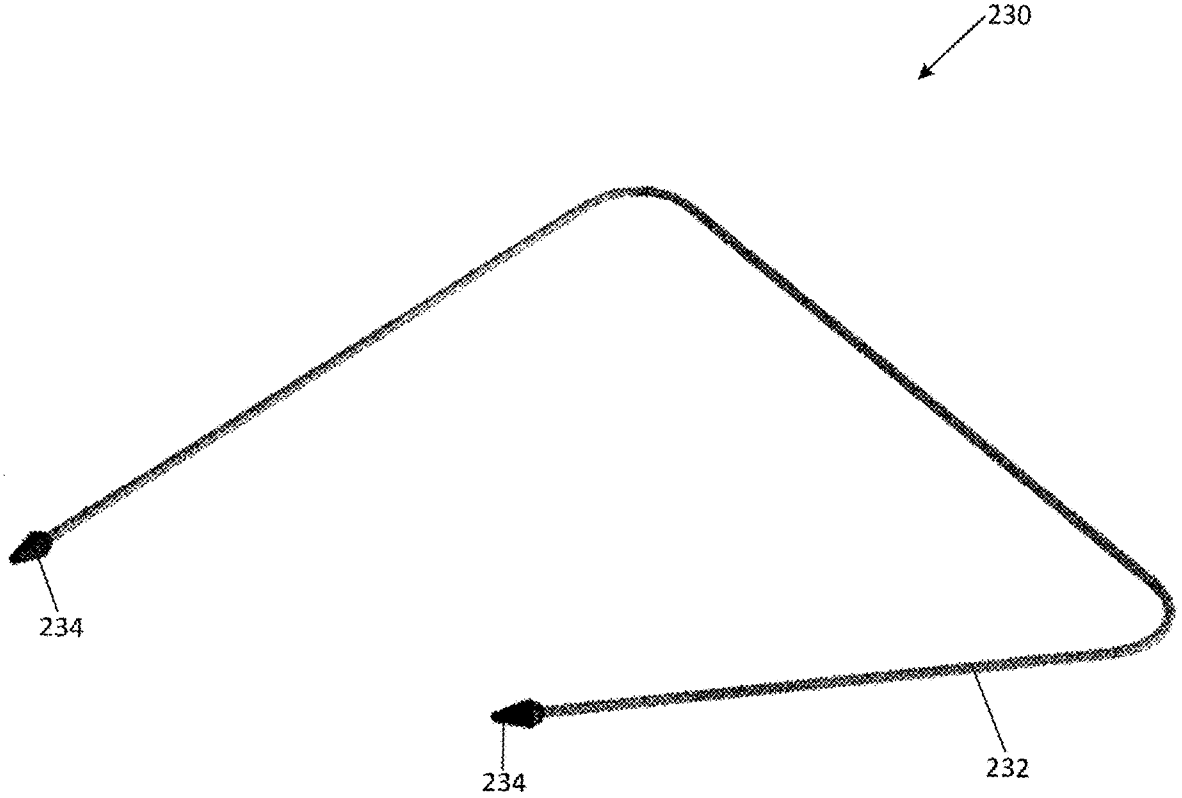
FIG. 26 is an isometric view of a cutting string for use with a veterinary saw assembly according to one example.

An exemplary cutting string 230 is shown in FIG. 26. In this example, the cutting string 230 includes a piece of abrasive wire 232. As noted above, this can be foetotomy wire as known to veterinarians. At each end of the wire 230 is a portion that is wider than the main length of the string. In this example the wider portions are knobs 234. The knobs 234 can be made of metal, ceramic or another suitable material. The knobs 234 can be welded to the cutting string 230. The knobs 234 can have tapered distal ends to facilitate insertion of the knobs through holes in the drive coupler of the tool, such as the holes 187 shown in FIG. 23 and discussed below. The knobs may also assist placement of the cutting string around a foetus. The additional weight of the knobs may help them to act as sinkers so that a veterinarian can pass one end of the cutting string over a part of the foetus to be cut. The weight of the knob at the end of the cutting string may then draw the cutting string downwards over the foetus. The veterinarian can then reach in under the part to be cut, grab the end of the cutting string and pull it out of the animal. The cutting string 230 can also have markings near the ends for indicating to a user when the cutting string 230 is nearly fully paid out. This may be particularly useful when the drive coupler is a reel that has the cutting string wound onto it. The markings can be colourings that are different from the rest of the cutting string.

Instructions for installing the cutting string on the saw assembly may be provided with one or both of the saw assembly and the cutting string. The instructions may be provided in or on packaging that contains the saw assembly, the cutting string or both.

The instructions for attaching the cutting string to the saw assembly would depend on the configuration of the saw assembly and the cutting string. For example, for the saw assembly 110 shown in FIGS. 1 to 3, using a cutting string in the form of a loop, the instructions could include the steps:

a) remove the cover 10
b) move one or both of the pulleys 12 inwards
c) place the loop of cutting string 2 over the pulleys 12 and the drive coupler 11
d) move one or both of the pulleys 12 towards the ends of the legs to produce the desired tension on the cutting string 2
e) replace the cover 10.

In another example, the instructions for the saw assembly 140 using the cutting string 230 could include the steps:

a) remove the side caps 148
b) insert the knob 234 at one end of the cutting string 230 through the aperture 187 on one of the reels 178
c) open the flap 144
d) drop the other end of the cutting string 230 into the end of the near guide tube 168
e) tilt the end of the assembly downwards, allowing the weight of the knob 234 to pull the cutting string 230 through the guide tube 168 and out of the tip 164
f) after placing the cutting string 230 around the part to be cut, drop the free end of the cutting string 230 into the other guide tube 168 at the tip 164
g) tilt the end of the assembly upwards, allowing the knob 234 to pull the cutting string through the guide tube 168
h) insert the knob 234 at the free end of the cutting string 230 into the aperture 187 on the other reel 178.
i) replace the side caps 148.

In a variation on the above instructions, the housing 160 and guide tubes could be removed from the body 142, the tip 164 removed from the housing. The guide tubes 168 can them be turned so that slits 169 and 172 are aligned. The cutting string can then be pushed into the guide tubes from the side, through the aligned slits.

In another example, the instructions for the saw assembly 240 using connectors 250 and the cutting string 230 could include the steps:

a) place the knob 234 at one end of the cutting string in the hole 254 of one of the connectors
b) place the portion of cutting string adjacent the knob 234 in the slot 252
c) if present, position the retainer over the cutting string
d) repeat steps a) to c) with the other end of the cutting string and the other connector.

Figure 18:
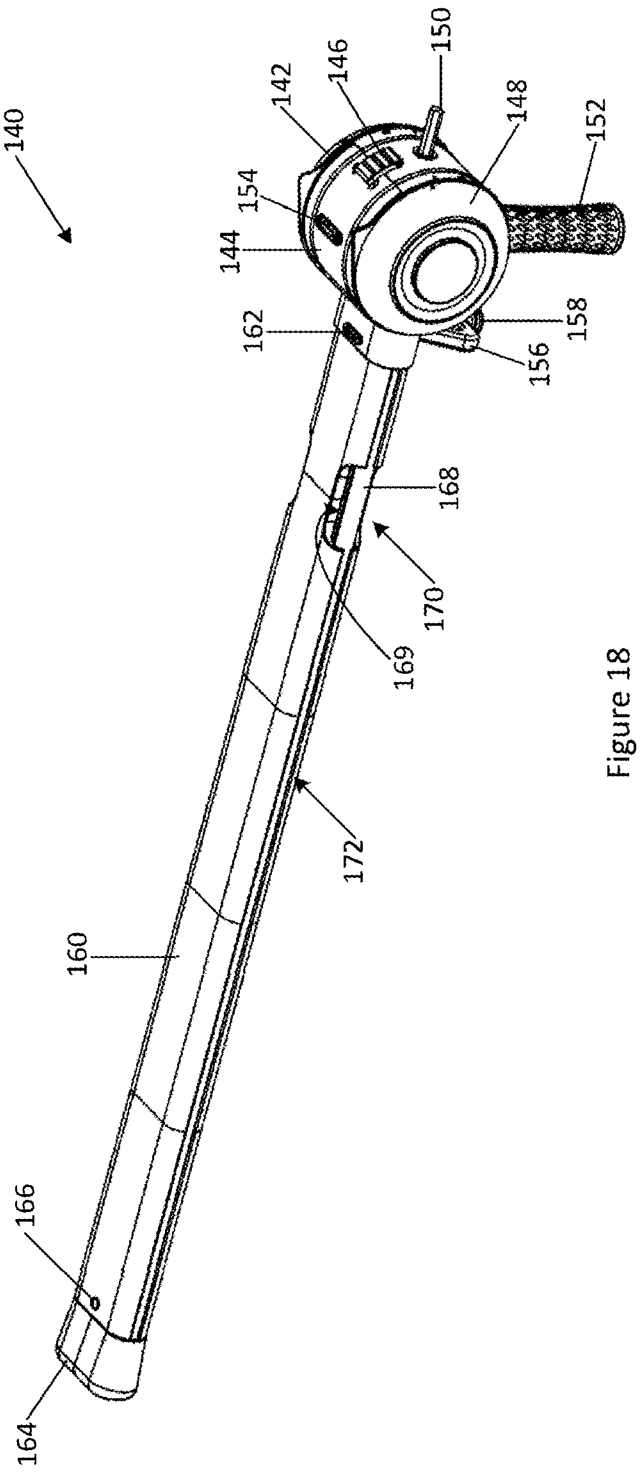
FIG. 18 is an isometric view of a veterinary saw assembly according to another embodiment.

FIG. 18 shows another example veterinary saw assembly 140. This assembly may be particularly suited to performing foetotomies. The assembly 140 includes a body 140 that can include a flap 144 and side caps 148. The flap 144 can be opened, for example by releasing the flap clip 146, to allow access to a gear compartment. The side caps 148 can be opened, for example by turning them to an unlocked position and removing them, to allow access to reel compartments.

Protruding from the body 142 is a tool coupler 150. In this example, the tool coupler 150 can be a shank for coupling to a chuck of a power drill. The tool can rotate the tool coupler to drive movement of the cutting string.

The assembly 140 has an elongate housing 160 that is configured to be inserted into a birth canal. The elongate housing 160 can be made of plastic in one example. Guide tubes 168 extend along and within the elongate housing 160 towards the tip 164 to guide the cutting string to the location at which it can perform cuts—at the tip. The guide tubes 168 can be made a hard material, in particular one that is harder than the cutting string. The guide tubes can be made of steel, for example stainless steel. The housing 160 can be releasable connected to the body 142. A release slider 162 is provided to release the housing 160 from the body 142. The tip 164 can be releasable from the housing 160. In the example shown, sprung button clips 166 are provided to clip the tip 164 to the housing 160. The tip 164 may be abraded or otherwise worn by the cutting string in use and may be replaceable. In alternative examples, the elongate housing and the guide tubes can be integrally formed.

Also shown on body 142 is a clutch slider 154. This operates a clutch that is detailed further with respect to FIG. 23. Extending downwards from the body 142 is a handle 152. This could be held by a user when operating the power tool coupled to the tool coupler 150. A puller handle 156 is also attached to the body, as is a lug 158. The lug 158 may provide an attachment point for a puller chain (not shown). After performing a cut, a user may pass a puller chain over a cut part, or otherwise attach it to the cut part, and attach the puller chain to the lug 158. Holding the puller handle 156, the user can then pull the cut part from the animal.

Running along each side of the housing 60 is a slit 172. A slit 169 also runs along each guide tube 168. The guide tubes are also rotatable around their respective long axes. The housing 160 is provided with access ports 170, through which a user can reach and rotate the guide tubes 168. To pass the cutting string over a part to be cut—for example of a foetus—the user can rotate the guide tubes 168 so that the slits 169 are aligned with the slits 172 of the housing 160. This allows the cutting string to come free of the housing. The user can free one end of the cutting string from its connection to the drive coupler, remove it from the housing 160 via the slits 169 and 172, unspool a suitable length (e.g. 3-4 arm lengths) using the clutch, pass the cutting string over the part to be cut, insert the cutting string back into the housing 160 via the slits 169 and 172, reconnect the end of the cutting string to the drive coupler, and rotate the guide tubes 168 so that the slits 169 are facing inwards. The user may remove the tip 164 from the housing 160 and/or remove the housing 160 from the body 142 to assist this process. In an alternative arrangement, a single guide tube could be provided. For example, the guide tube could be in the shape of an elongate "U", with two holes or slits out of which a portion of the cutting string can extend.

Figure 19:
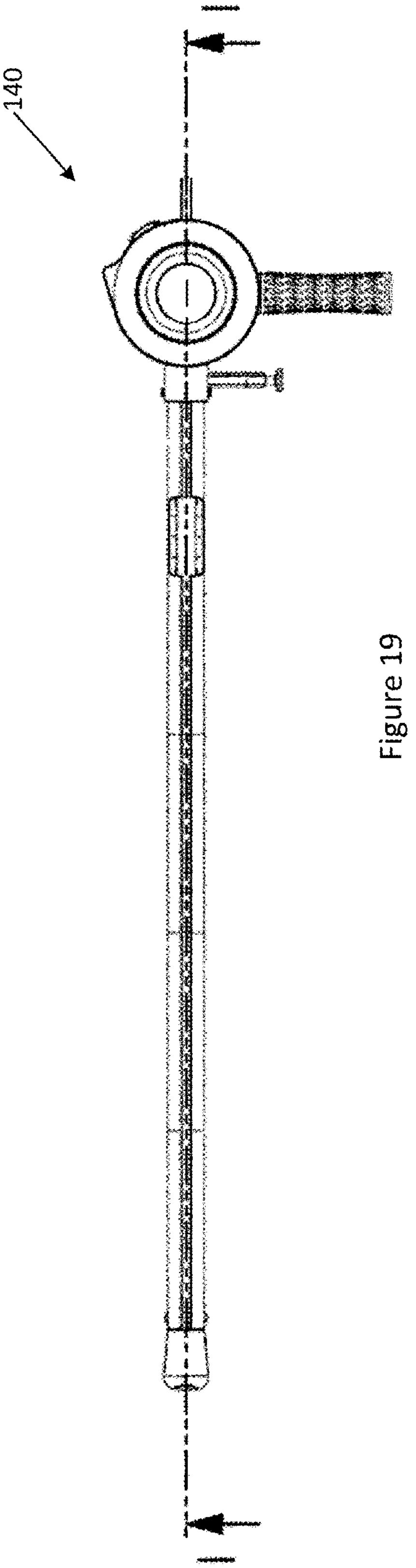
FIG. 19 is a side view of the veterinary saw assembly of FIG. 18.
Figure 20:
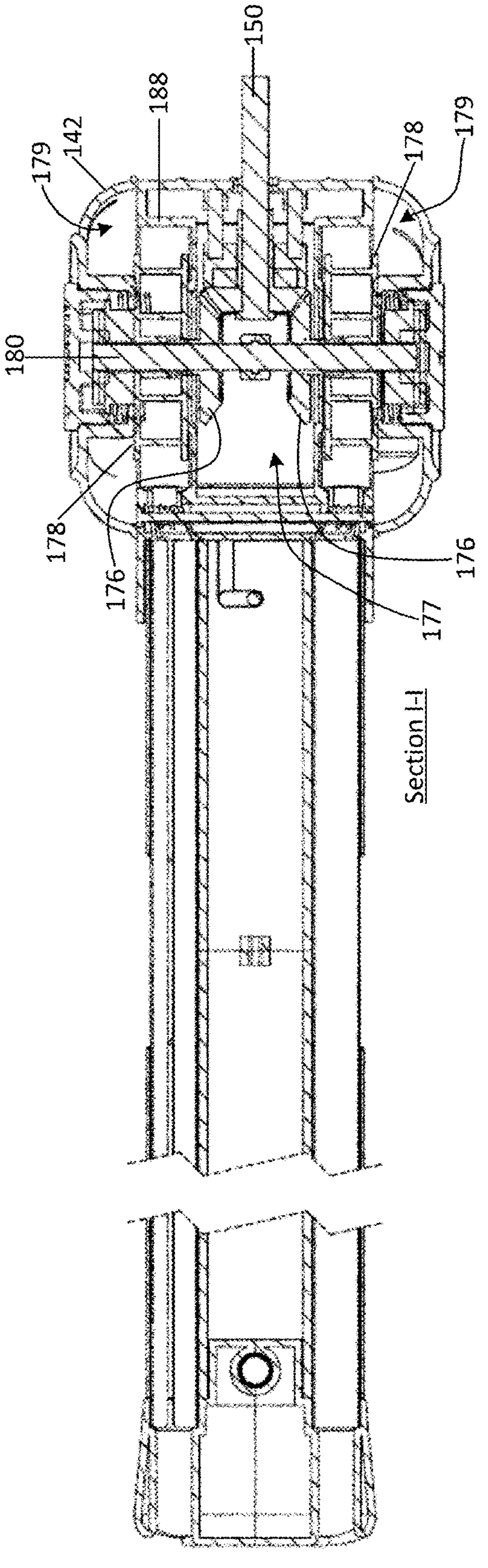
FIG. 20 is a cross-sectional view of the top of the veterinary saw assembly of FIGS. 18 and 19.

FIG. 20 is a cross-section view of the assembly 140 looking towards the top as indicated by the line I-I in FIG. 19. In this view, it can be seen that rotation of the tool coupler 150 drives an input gear 174 that can drive two output gears 176. In this example, the gears are bevel gears that rotate about axes that are at 90° to each other. The output gears 176 are coupled to respective drive couplers. In this example, the drive couplers are reels 178. The reels 178 and output gears 176 rotate about a shaft 180. In use, the cutting string can be wound on the reels such that it is paid out from one reel 178 and taken up on the other. The body 142 of the assembly is divided by barrier 188 into a gear compartment 177 and a reel compartment 179.

Figure 23:
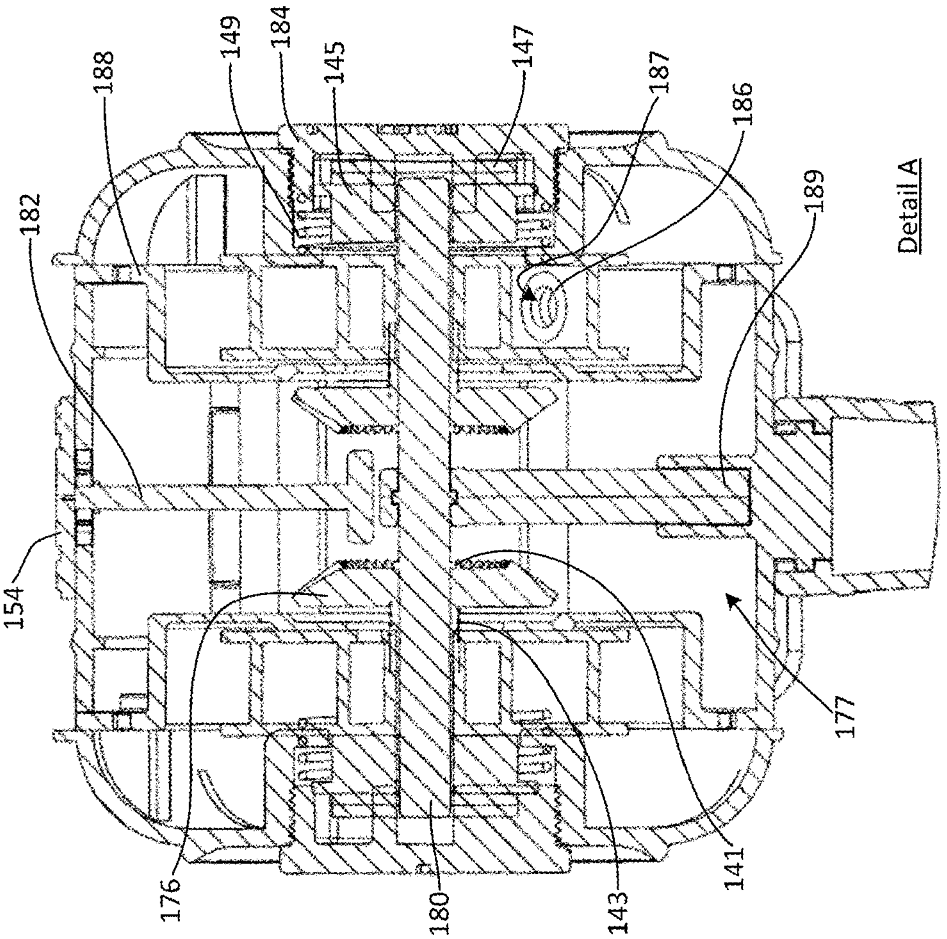
FIG. 23 is a detail of the cross-sectional end view of FIG. 22.
Figure 21:
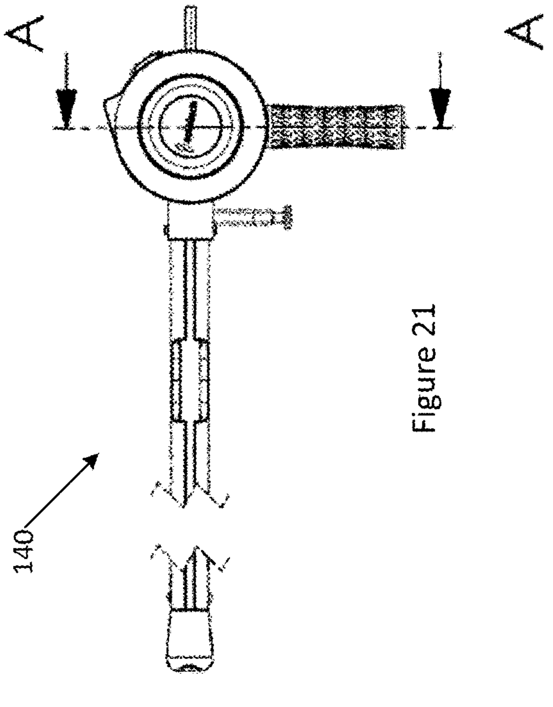
FIG. 21 is another side view of the veterinary saw assembly of FIGS. 18-20.
Figure 22:
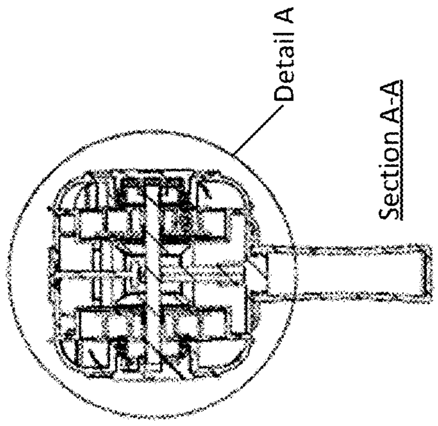
FIG. 22 is a cross-sectional end view of the veterinary saw assembly of FIGS. 18-21.

FIG. 22 shows a cross-sectional view of the front of the assembly 140 as indicated by the line A-A of FIG. 21. FIG. 23 shows Detail A of FIG. 22.

The clutch slider 154, noted with respect to FIG. 18, is connected to a clutch pusher 182. The clutch pusher 182 extends into the gear compartment 177 between the output gears 176. The clutch slider 154 is normally positioned in the middle of its range of motion such that the clutch pusher 182 is between, but does not push on, the output gears 176. By sliding the clutch slider 154 to one side, a user can cause the clutch pusher 182 to push sideways on one of the output gears 176 and disengage that gear from the input gear 174 (shown in FIG. 20). The corresponding reel (connected to the disengaged output gear) can then be freewheeled, allowing the user to draw out a length of cutting string from that reel. The output gears 176 can be biased into the engaged position. In this example, helical springs 143 are placed over the shaft 180 and bias the output gears 176 towards stops 141.

Also shown in FIG. 23 are reel brakes which can include drag stops 145 that bear on the reels 178 to slow their rotation. This may be useful in preventing the reels from overrunning when they are disengaged from the input gear by the clutch.

The reel brakes can be adjustable to control the amount of resistance to rotation that they provide. In this example, drag adjuster knobs 184 can be screwed inwards against the bias of springs 149 to increase the strength with which the drag stops 145 bear on the reels 178. Slip disks 147 are provided between the drag stops 145 and the drag adjuster knobs 184 to prevent rotation of the reels 176 causing screwing/unscrewing of the drag adjuster knobs 184.

Each reel 178 includes a hole 187 for receiving an end of the cutting string. For example, each hole 187 can receive a knob 234 of the cutting string 230 shown in FIG. 26. A bush 186 can be provided on each hole. The bushes 186 can be made of a non-conductive material. This may protect the user from electric shocks, for example if the cutting string comes into contact with an electric fence. The bushes can be relatively soft so that a tapered knob of the cutting string can expand them and force its way through the hole 187.

Also shown in FIG. 23 is a vertical support post 189. This supports the shaft 180 to maintain correct positioning and alignment of the output gears 176.

In a cutting operation, the user can drive the tool in one direction then switch the tool's direction of operation, for example with a manual direction switch as is commonly found on power drills. This allows the cutting string to repeatedly reverse directions—i.e. oscillate. In this example, an indicator may be provided on the cutting string near its end so that the user can switch directions if they see the indicator. For example, the ends of the cutting string could be a different colour from the rest of the cutting string. The assembly 140 may include alternatively or additionally include a detector for detecting when the cutting string is nearly fully paid out from one reel and an indicator for indicating this to the user. The detector could be, for example, a rotation counter or encoder that is set to detect when the reel has rotated sufficiently to be nearing the end of the cutting string. The detector could alternatively be a mechanical distance sensor such as a finger that is biased towards the cutting string that is wound on the wheel. The angle of the finger would depend on the amount of cutting string on the reel. The indicator could for example be a needle gauge, a display screen, a buzzer etc.

In an alternative example, a mechanism could be included in the assembly 140 to convert rotation of the tool coupler in a single direction to oscillation of the reels.

Figure 24:
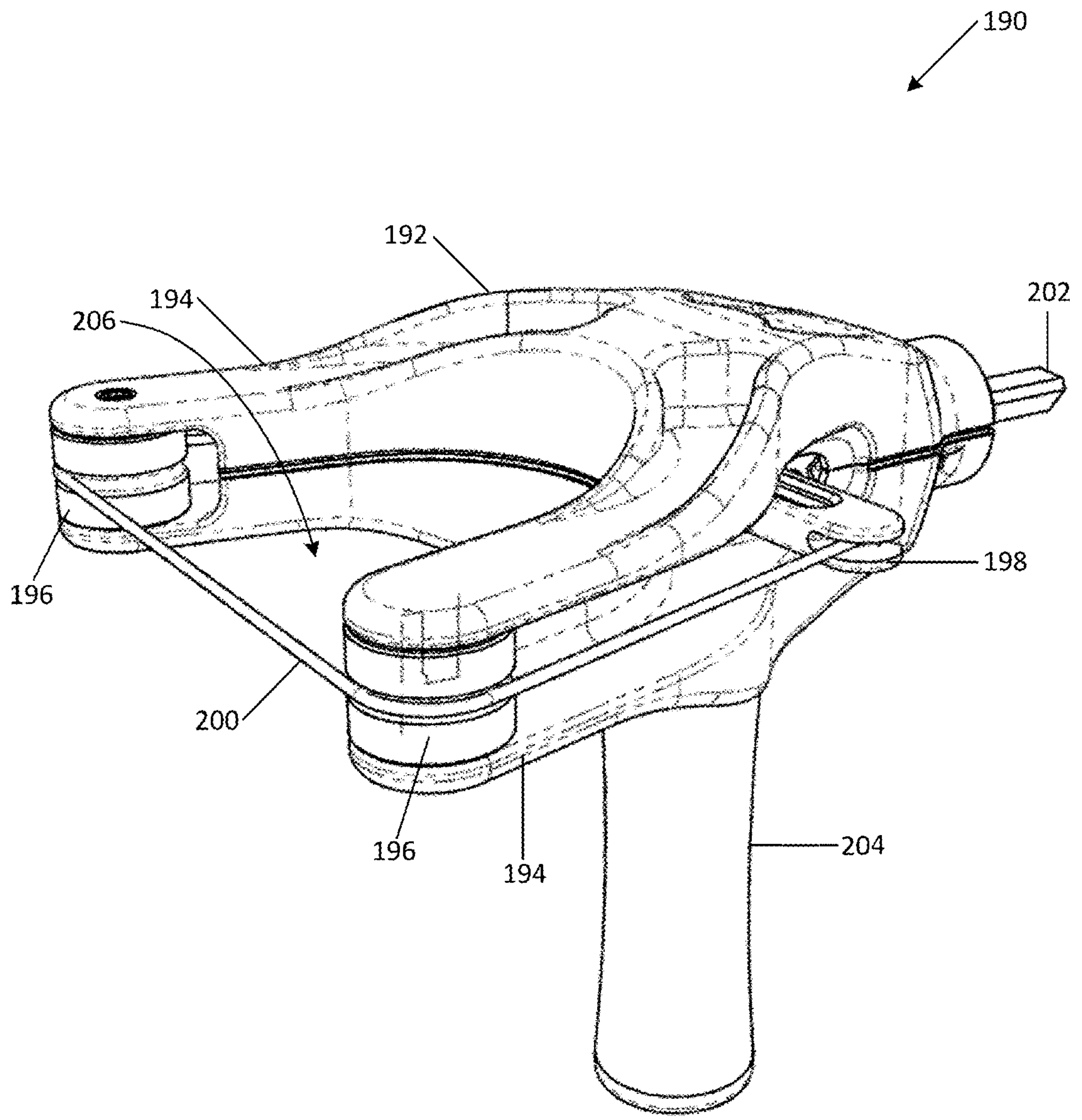
FIG. 24 is an isometric view of a veterinary saw assembly according to another example.

FIG. 24 shows another example veterinary saw assembly 190. The saw assembly 190 may be particularly suited to cutting horns, although it may also be suitable for cutting tusks, hoofs, antlers, deer velvet, and/or teeth. The saw assembly 190 is shown loaded with a cutting string 200.

The assembly 190 includes a body 192. The body 192 includes two legs 194 that support the cutting string 200 across a recess 206 formed between the legs 194. When cutting a part of an animal, for example a horn, the part can be inserted in recess between the legs 194 and the cutting string 200 or the part can be placed in front of the cutting string and the cutting string pushed towards the part.

At the end of each leg 194 is a pulley 196. The pulleys can be idler pulleys that passively rotate as the cutting string 200 passes over them. The end of the cutting string 200 are attached to a drive coupler 198. A tool coupler 202 extends from the body 192 to couple to a power tool. In this example, the tool coupler 202 is a shank for coupling to a chuck of a power drill. A handle 204 also extends downwards from the body 192.

Figure 25:
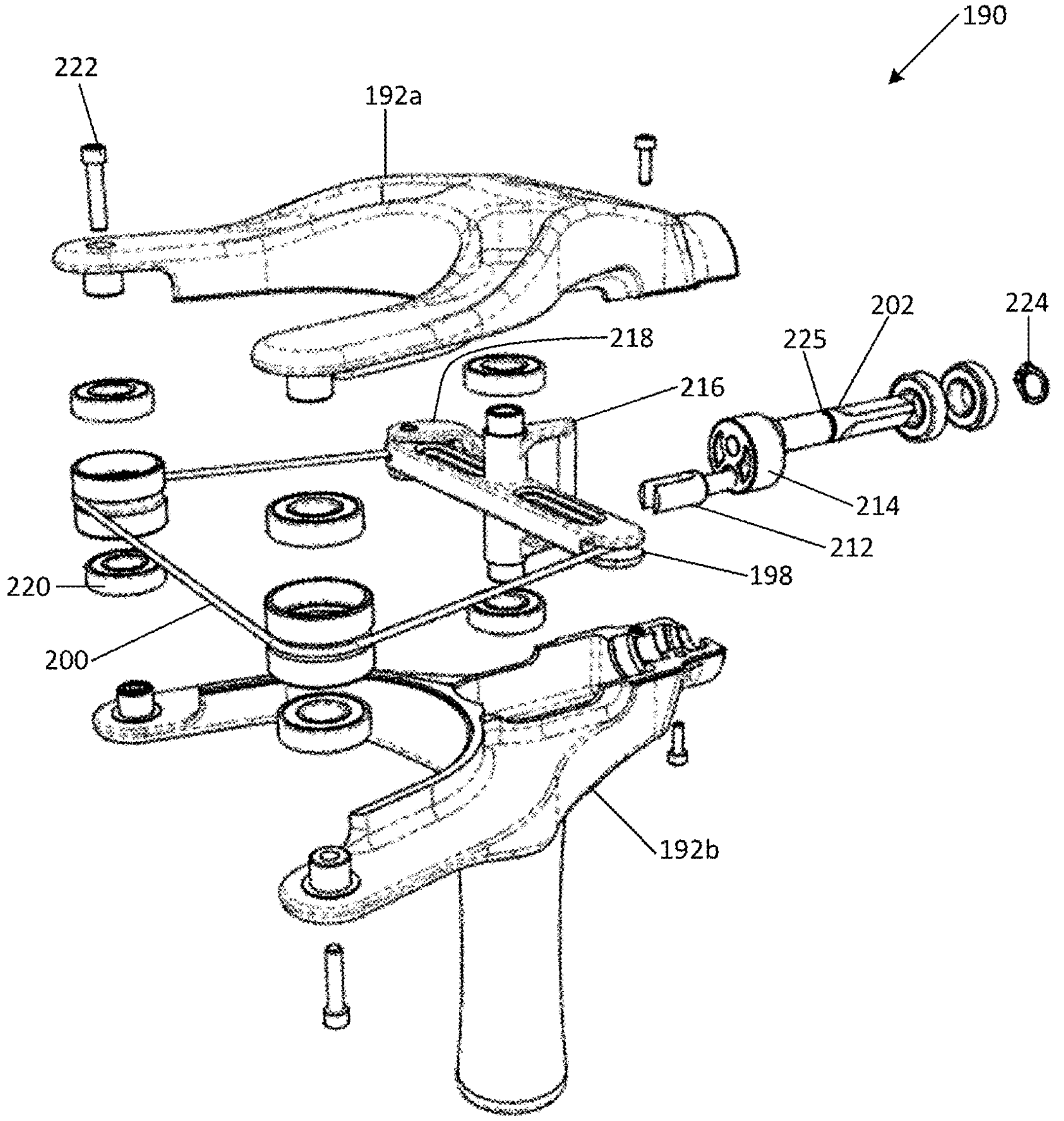
FIG. 25 is an exploded view of the veterinary saw assembly of FIG. 24.

FIG. 25 is an exploded view of the saw assembly 190 of FIG. 24. The upper half **192*a* and lower half 192*b* of the body have been separated. As shown in this drawing, the assembly 190 can include a mechanism for converting rotary motion of the tool coupler 202 into oscillatory motion of the drive coupler 198. The tool coupler is connected to a wheel 214 to rotate the wheel. Connected to the wheel at a point offset from the rotational axis of the tool coupler is a link arm 212. The link arm 212 is rotatably mounted to the wheel 214. The link arm is slidably linked to a shaft 216 that is connected to the drive coupler 198. When the tool coupler 202 drives the wheel to rotate, the link arm 212 revolves around the rotational axis of the tool coupler 202 while rotating (with respect to the wheel 214) about its own axis. As it does so, it slides up and down the shaft 216 while pushing the shaft side-to-side. This oscillates the drive coupler back and forth about its own rotational axis, causing the cutting string to be driven back and forth. The assembly 190 also includes a tension lever 218 for allowing the cutting string 200 to be tightened and loosened. In this example, the cutting lever is a bistable overcentre lever that can be switched between the retracted position shown in FIG. 25 and an extended position in which it is rotated about 180° towards the front of the assembly 190. In the retracted position, the cutting string is shortened compared to the extended position. The user can loosen the cutting string by putting the lever 218 in the extended position to help pass the string over a part to be cut, such as a horn, then tighten the string by moving the lever 218 to the retracted position for cutting. It may also be easier to install and remove the string when the lever 218** is in the extended position.

Also shown in FIG. 25 are several bearings 220 for rotating parts, bolts 222 for bolting the assembly together, and a circular clip 224 that goes in the groove 225 and prevents the tool coupler 202 from moving longitudinally.

Figure 27:
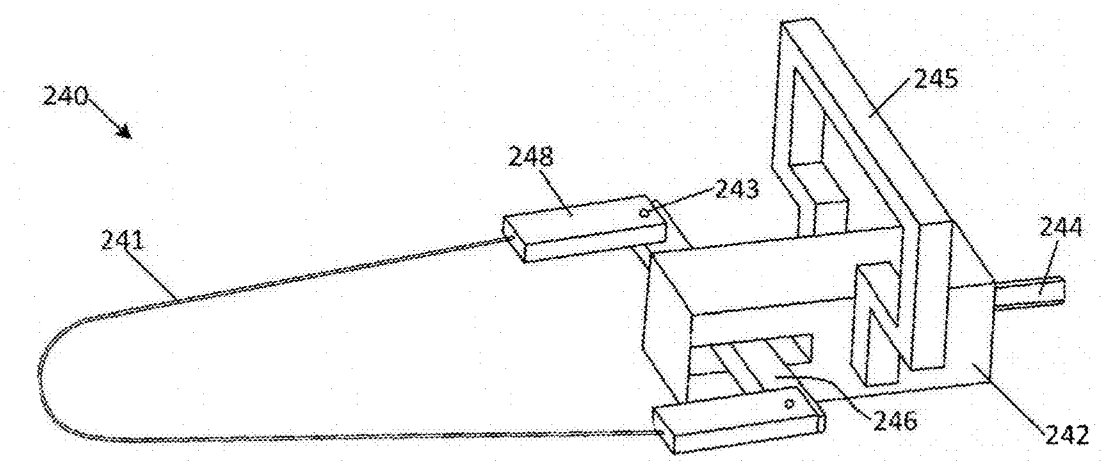
FIG. 27 is an isometric view of a veterinary saw assembly according to another example.

FIG. 27 shows another exemplary veterinary saw assembly 240. The saw assembly 240 may be particularly suited to cutting horns and may be used in a similar matter to the saw assembly 190 of FIG. 25. The saw assembly 240 has a main body 242, a tool coupler 244, a drive coupler (including rotating link 246 and connectors 248), a handle 245 and is shown with a cutting string 241, similar to the saw assembly 190. The saw assembly 240 differs from the saw assembly 190 in certain respects.

The saw assembly 240 does not include the arms 194 or recess 206 of the saw assembly 190. The saw assembly 240 would be used by placing the part to be cut (e.g. a horn) between the cutting string 241 and the body 242 of the saw assembly and pulling back on the saw assembly 240 to pull the cutting string 241 through the part to be cut.

The drive coupler of the saw assembly 240 can include a rotating link 242, which may be substantially similar to the drive coupler 198 of the saw assembly 190, and connectors 248 pivotably connected to the rotating link 242 at pivot points 243. The connectors 248 can connect to respective ends of the cutting string 241. By allowing the connectors to pivot as the rotating link 242 oscillates (i.e. rotates one way then the other), the ends of the cutting string 241 can stay relatively straight. This may reduce fatigue on the ends of the cutting string, thereby reducing the chance of it breaking and increasing its life.

The handle 245 of the saw assembly is generally in the form of a loop. The handle 245 extends upwards from the body 242 of the saw assembly. The handle 245 can also extend backwards so that it can be gripped by a user approximately above the tool when the tool is coupled to the tool coupler. The handle 245 can be rounded. The handle 245 can have a grip (e.g. a rubber grip) and/or padding on it. The handle 245 may be similar to a chainsaw handlebar.

Figure 28:
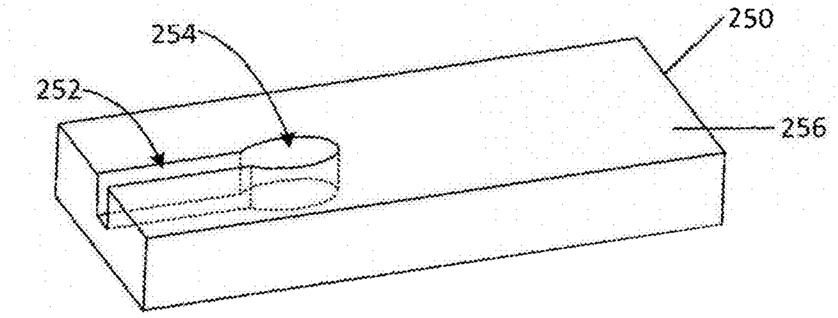
FIG. 28 is an isometric view of a connector for a cutting string according to one example.

FIG. 28 shows an exemplary connector 250 for attaching an end of a cutting string to a saw assembly. The connector 250 can be formed of a main body 256 with a hole 254 and a slot 252 in it. The hole 254 is formed at the end of the slot 252. In use, a wide portion (e.g. a knob) of a cutting string can be placed in the hole 254, with the thinner main length of the cutting string extending out of the body 256 through the slot 252. The width of the slot 252 is less than the width of the wide portion of the cutting string so that the cutting string can not pull out of the connector through the slot 252. A retainer may be selectively positionable over the cutting string to prevent it from lifting out of the slot 252 and hole 254 (e.g. moving out vertically in the orientation of FIG. 28). This could be, for example, a cover, a pin, a screw, a flap or other suitable component. Each of the connectors 248 of the saw assembly 240 could have the features of the connector 250.

Other suitable arrangements for attaching the ends of a cutting string to the saw assembly are possible. For example, the end of the cutting string could extend into a hole in the connector. A screw (e.g. a finger screw) extending through a threaded hole that intersects the string hole can clamp the string in place by being tightened against it. In another example, a loop the end of the string could be passed over a vertical post with a wide upper portion to reside around a narrower, lower portion. A biased element such as a tongue of resilient material (e.g. a metal tongue) could be biased against the wider portion to prevent the loop coming off the post in use. In another example, a spring-loaded wedge could be provided within a recess in the connector. The end of the cutting string could be inserted between the wedge and the side of the recess and retained in place by friction between the wedge and the recess side. One or more teeth could be provided on the side of the wedge and recess to improve grip on the cutting string.

Figure 29:
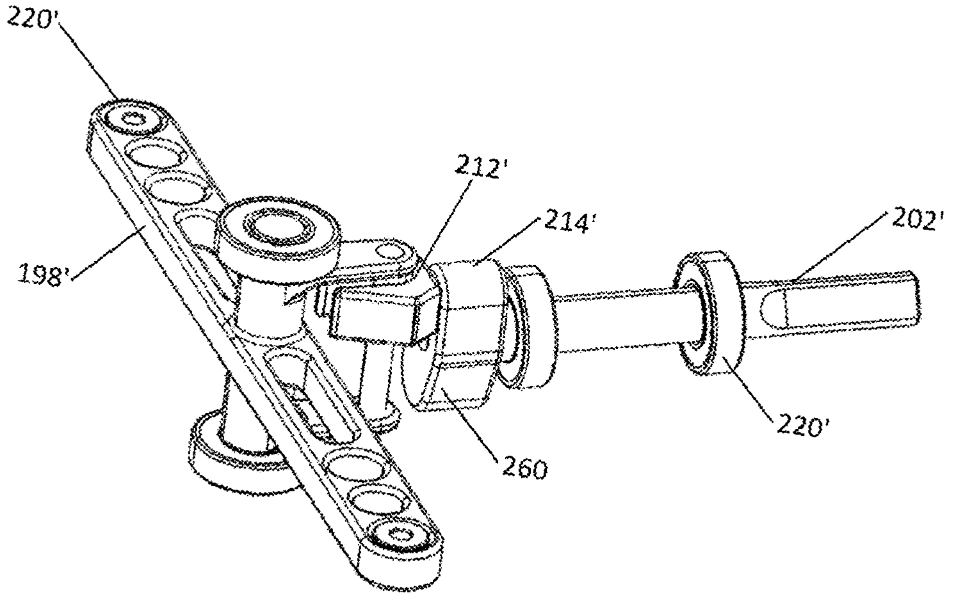
FIG. 29 is an isometric view of components of a veterinary saw assembly according to one example.

FIG. 29 shows components of the veterinary saw assembly that differ in some respects from the components of the saw assembly 190. In some examples, these components can be used in the saw assembly 240, with the rotating link 220' forming the rotating link 246 of the drive coupler of the assembly 240 and the tool coupler 202' forming the tool coupler 244.

The rotating link 246' is relatively long to provide a longer stroke of the cutting string. The bearings 220' supporting the tool coupler 202' are relatively widely spaced to provide better stability. Bearings 220' are provided at the ends of the rotating link 220' to provide pivot point for connectors (not shown). The link arm 212' is relatively large to provide greater strength. The rotor 214' is non-circular and includes a counterweight portion 260 that counteracts vibrations produced during oscillation of the rotating link 246' (and other drive coupler components). The counterweight portion 260 is placed on the opposite side of the axis of rotation of the rotor 214' from the link arm 212'.

In some examples, it may be useful to reduce the transmission of vibrations from the saw assembly to the tool. Vibrations may be generated during oscillation of an oscillating member (e.g. part or all of a drive coupler), rotation of an eccentric mass, or other eccentric loads on rotating members, for example. Decoupling the tool coupler from the movement of other parts of the saw assembly along or about one or more axes (i.e. allowing relative movement with one or more linear or rotational degrees of freedom) may reduce the transmission of vibrations from the saw assembly to the tool, and consequently to the user.

In one example, the drive coupler (e.g. the drive coupler 202, 202' or 244) is connected to the rest of the saw assembly by a flexible shaft, similar to a flexible drive shaft for a drill. This allows the drive coupler to translate with respect to the rest of the saw assembly in one to three dimensions, and to rotate about two axes orthogonal to its own longitudinal axis, while still transmitting rotation about its own longitudinal axis to the drive coupler. In another example, the tool coupler could be connected to the rest of the tool by a spline, allowing translation along its own longitudinal axis while transmitting rotation about the axis to the drive coupler. In another example, the tool coupler could be connected to the rest of the saw assembly by a universal joint, allowing the drive coupler to rotation about two axes orthogonal to its longitudinal axis while transmitting rotation about its longitudinal axis to the drive coupler. Combinations of one or more of these vibration transmission arrangements may also be used.

EXEMPLARY EMBODIMENTS

1. A veterinary saw assembly comprising:
   a saw assembly body configured to engage with a body of a power tool;
   a drive coupler configured to couple to a cutting string and drive longitudinal movement of the cutting string; and
   a tool coupler coupled to the drive coupler and configured to releasably couple to a moving part of the power tool to convert movement of the moving part of the power tool to movement of the drive coupler and thereby to produce longitudinal movement of the cutting string.
2. The veterinary saw assembly of exemplary embodiment 1 configured to use a cutting wire as the cutting string.
3. The veterinary saw assembly of exemplary embodiment 1 or exemplary embodiment 2 wherein the drive coupler is a driven pulley.
4. The veterinary saw assembly of any one of exemplary embodiments 1 to 3 wherein the power tool is a drill.

5. The veterinary saw assembly of exemplary embodiment 4 wherein the tool coupler comprises a shank configured to couple to a chuck of the drill.
6. The veterinary saw assembly of exemplary embodiment 4 or exemplary embodiment 5 further comprising a mechanism for converting rotation of the tool coupler about one axis to movement of the cutting string generally along the axis.
7. The veterinary saw assembly of exemplary embodiment 6 wherein the mechanism comprises a pair of bevel gears between the tool coupler and the drive coupler.
8. The veterinary saw assembly of any one of exemplary embodiments 1 to 3 wherein the power tool is a grinder.
9. The veterinary saw assembly of exemplary embodiment 8 wherein the tool coupler is an inner portion of a coupler body that is configured to be mounted on a spindle of the grinder.
10. The veterinary saw assembly of exemplary embodiment 8 or exemplary embodiment 9 wherein the drive coupler is a peripheral portion of a coupler body configured to support the coupling string thereon.
11. The veterinary saw assembly of exemplary embodiment 10 wherein the peripheral portion of the coupler body has a channel formed in it for receiving the cutting string.
12. The veterinary saw assembly of exemplary embodiment 10 or 11 when dependent on exemplary embodiment 9 wherein the tool coupler and the drive coupler are comprised in a disc, with the inner portion of a coupler body being an inner portion of the disc and the peripheral portion of a coupler body being a peripheral portion of the disc.
13. The veterinary saw assembly of any one of exemplary embodiments 1 to 12 wherein the veterinary saw is a dehorning saw configured to cut horns of an animal.
14. The veterinary saw assembly of exemplary embodiment 13 wherein the saw assembly body has a recess formed at one side, wherein the saw is configured such that the cutting string extends across the recess such that a horn can be received between the saw assembly body and the cutting string and at least partly within the recess.
15. The veterinary saw assembly of exemplary embodiment 14 further comprising a cutting string guide on each side of the recess to maintain the cutting string in position across the recess in use.
16. The veterinary saw assembly of exemplary embodiment 15 wherein one or more of the cutting string guides are movable to adjust the length of a cutting portion of the cutting string.
17. The veterinary saw assembly of exemplary embodiment 16 wherein the one or more cutting string guides that are movable are mounted in slots with their respective positions along the slots being adjustable.
18. The veterinary saw assembly of any one of exemplary embodiments 15 to 17 wherein the cutting string guides are idler pulleys.
19. The veterinary saw assembly of any one of exemplary embodiments 1 to 12 wherein the veterinary saw is a foetotomy saw configured to cut a foetus within an animal.
20. The veterinary saw assembly of exemplary embodiment 19 comprising an elongate housing configured to be inserted into the birth canal of the animal.
21. The veterinary saw assembly of exemplary embodiment 19 or exemplary embodiment 20 further comprising a rotary-to-oscillatory-motion mechanism configured to convert unidirectional rotation of the tool coupler to oscillatory motion of the drive coupler.
22. The veterinary saw assembly of exemplary embodiment 21 wherein the rotary-to-oscillatory-motion mechanism is configured to convert the unidirectional rotation of the tool coupler to oscillatory rotation of the drive coupler.
23. The veterinary saw assembly of any one of exemplary embodiments 13 to 22 further comprising one or more connection points for attachment of puller chains to the saw.
24. The veterinary saw assembly of any one of exemplary embodiments 13 to 23 wherein the drive coupler is movable to adjust the length of a cutting portion of the cutting string.
25. The veterinary saw assembly of exemplary embodiment 24 wherein the drive coupler is a pulley.
26. The veterinary saw assembly of exemplary embodiment 25 wherein the pulley is mounted to a sliding block that can slide within the saw to adjust the length of the cutting portion of the cutting string.
27. The veterinary saw assembly of exemplary embodiment 26 further comprising a cord coupled to the sliding block for controlling sliding of the sliding block when pulled.
28. The veterinary saw assembly of exemplary embodiment 27 further comprising one or more biasing members coupled to the sliding block for biasing the sliding block towards a position in which the cutting string is retracted.
29. The veterinary saw assembly of any one of exemplary embodiments 1 to 28 further comprising an openable cover configured to allow access to the drive coupler when opened, thereby allowing installation and/or removal of the cutting string.
30. The veterinary saw assembly of any one of exemplary embodiments 1 to 29 further comprising a wiper for removing cutting debris from the cutting string during a cutting procedure.
31. The veterinary saw assembly of any one of exemplary embodiments 1 to 12 wherein the veterinary saw is a hoof-cutting saw configured to cut a hoof of an animal.
32. The veterinary saw assembly of any one of exemplary embodiments 1 to 12 wherein the veterinary saw is a tooth- or tusk-cutting saw for cutting a tooth or tusk of an animal.

While the present invention has been illustrated by the description of the examples thereof, and while the examples have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatuses, assemblies, kits, methods, and illustrative examples shown and described. Accordingly, departures may be made from such details without departure from the spirit or scope of the Applicant's general inventive concept.

The invention claimed is:

1. A veterinary saw assembly comprising:

a saw assembly body;

a drive coupler movably coupled to the saw assembly body and configured to couple to a cutting string and drive longitudinal movement of the cutting string; and a tool coupler, wherein the tool coupler is:

movably coupled to the saw assembly body;

coupled to the drive coupler; and configured to releasably couple to a moving part of a power tool to convert movement of the moving part of the power tool to movement of the drive coupler and thereby to produce longitudinal movement of the cutting string;

the veterinary saw assembly further comprising one or more guide tubes for guiding the cutting string from the saw assembly body to a cutting tip of the the veterinary saw assembly;

wherein each guide tube has an elongate slit formed along its length for allowing passage of the cutting string through the slit;

the veterinary saw assembly further comprising an elongate housing over the guide tube(s), wherein the elongate housing has one or more elongate slits along its length and wherein the guide tube(s) and elongate housing are relatively movable between one or more first configurations in which one or more of the guide tube slit(s) are aligned with housing slit(s) to allow passage of the cutting string therethrough and one or more second configurations in which the one or more of the guide tube slit(s) are not aligned with housing slit(s) to prevent passage of the cutting string therethrough.

2. The veterinary saw assembly of claim 1 wherein the drive coupler comprises a reel.

3. The veterinary saw assembly of claim 2 wherein the drive coupler further comprises a second reel coupled to the tool coupler, wherein, for a given direction of rotation of the tool coupler, one of the reels is configured to pay out the cutting string and the other is configured to take up the cutting string.

4. The veterinary saw assembly of claim 1 further comprising a clutch for selectively decoupling the drive coupler from the tool coupler.

5. The veterinary saw assembly of claim 4 wherein the drive coupler and the tool coupler are coupled to each other via gears and the clutch is configured to move one of the gears out of engagement with the other.

6. The veterinary saw assembly of claim 1 wherein the power tool is a reciprocating or oscillating tool, such as a reciprocating saw, oscillating saw or oscillating multi-tool, and wherein the tool coupler is configured to couple to a blade holder or attachment holder of the reciprocating or oscillating tool.

7. The veterinary saw assembly of claim 1 wherein the veterinary saw assembly is a foetotomy assembly for cutting a foetus within an animal.

8. The veterinary saw assembly of claim 7 further comprising one or more connection points for attachment of puller chains to the veterinary saw assembly.

9. A veterinary saw assembly comprising:

a saw assembly body;

a drive coupler movably coupled to the saw assembly body and configured to couple to a cutting string and drive longitudinal movement of the cutting string; and a tool coupler, wherein the tool coupler is:

movably coupled to the saw assembly body;

coupled to the drive coupler; and configured to releasably couple to a moving part of a power tool to convert movement of the moving part of the power tool to movement of the drive coupler and thereby to produce longitudinal movement of the cutting string;

the veterinary saw assembly further comprising a mechanism between the tool coupler and the drive coupler for converting uni-directional rotation of the tool coupler to oscillation of the drive coupler, the oscillation configured to drive reciprocation of the cutting string;

wherein the drive coupler comprises:

one or more rotating links configured to rotate in an oscillatory manner; and connectors pivotably attached to the rotating link(s), each connector being configured to connect to a respective end of the cutting string.

10. The veterinary saw assembly of claim 9 further comprising a counterweight between the tool coupler and the drive coupler to counteract vibrations produced during oscillation of the drive coupler.

11. The veterinary saw assembly of claim 9 wherein the tool coupler is movably connected to the saw assembly with one or more degrees of freedom in addition to the rotation of claim 9 to reduce transmission of vibrations from the saw assembly to the power tool in use.

12. The veterinary saw assembly of claim 9 wherein the power tool is a drill and wherein the tool coupler comprises:

a shank configured to couple to a chuck of the drill; or a shank or socket configured to couple to a drill bit.

13. The veterinary saw assembly of claim 9 wherein the veterinary saw assembly is a dehorning assembly for dehorning an animal.

14. A method of stringing a veterinary saw assembly, the method comprising:

providing the cutting string suitable for use with the veterinary saw assembly of claim 9; and installing the cutting string on the veterinary saw assembly of claim 9.

15. A kit comprising:

the veterinary saw assembly of claim 11; the cutting string suitable for use with the veterinary saw assembly of claim 9; and instructions for installing the cutting string on the veterinary saw assembly of claim 9.

16. The kit of claim 15 wherein the cutting string is abrasive wire.

17. A system comprising the veterinary saw of claim 11 and the cutting string configured for use with the veterinary saw assembly of claim 9 wherein the cutting string comprises a main length with a knob at each end of the main length, each knob being wider than the main length.

18. The system of claim 17 wherein the main length of the cutting string comprises abrasive wire.

* * * * *